US010913527B2

(12) United States Patent
Huynh

(10) Patent No.: US 10,913,527 B2
(45) Date of Patent: Feb. 9, 2021

(54) METHOD AND APPARATUS FOR LATENT FAULT DETECTION AND MANAGEMENT FOR FLY-BY-WIRE FLIGHT CONTROL SYSTEMS

(71) Applicant: The Boeing Company, Huntington Beach, CA (US)

(72) Inventor: Neal Van Huynh, Bellevue, WA (US)

(73) Assignee: The Boeing Company, Chicago, IL (US)

(*) Notice: Subject to any disclaimer, the term of this patent is extended or adjusted under 35 U.S.C. 154(b) by 698 days.

(21) Appl. No.: 15/077,552

(22) Filed: Mar. 22, 2016

(65) Prior Publication Data

US 2017/0274986 A1    Sep. 28, 2017

(51) Int. Cl.
  *B64C 13/50*  (2006.01)
  *B64C 13/04*  (2006.01)
  (Continued)

(52) U.S. Cl.
  CPC ............ *B64C 13/505* (2018.01); *B64C 13/04* (2013.01); *B64C 13/044* (2018.01);
  (Continued)

(58) Field of Classification Search
  CPC ....... B64C 13/503; B64C 13/28; B64C 13/12; B64C 13/26; B64C 13/30; B64C 13/04; G07C 5/08085; B64D 45/00
  See application file for complete search history.

(56) References Cited

U.S. PATENT DOCUMENTS

| 5,797,564 | A | * | 8/1998 | Cartmell | ................. | B64C 13/22 |
| | | | | | | 244/223 |
| 5,806,806 | A | * | 9/1998 | Boehringer | .......... | G05D 1/0077 |
| | | | | | | 244/196 |

(Continued)

FOREIGN PATENT DOCUMENTS

| EP | 0 743 581 A1 | 11/1996 |
| WO | 2005/066604 | 7/2005 |

OTHER PUBLICATIONS

Extended European Search Report dated Sep. 7, 2017 in European Application No. 17150550.6.
(Continued)

*Primary Examiner* — Medhat Badawi
*Assistant Examiner* — Vicente Rodriguez
(74) *Attorney, Agent, or Firm* — Womble Bond Dickinson (US) LLP

(57) ABSTRACT

An aircraft control system includes pilot and co-pilot flight control systems that each include a first shaft mechanically coupled to and displaced apart from a second shaft, the shafts defining and being rotatable about independent longitudinal axes. A connecting link enables rotation of one of the first shafts to rotate a corresponding one of the second shafts. A position transducer is mechanically coupled to each shaft and configured to communicate an electrical signal corresponding to the rotation of the respective shaft. A flight control unit electrically communicates with the position transducers and is configured to (a) receive the electrical signal from each position transducer, (b) detect a failure of the flight control system by detecting differences in the position transducers' electrical signals, and (c) communicate the electrical signal from the position transducer to a flight control surface actuation system to compensate for the detected failure.

20 Claims, 6 Drawing Sheets

(51) Int. Cl.
*G05D 1/00* (2006.01)
*G05D 1/08* (2006.01)
*B64C 13/12* (2006.01)
*G07C 5/08* (2006.01)

(52) U.S. Cl.
CPC .......... *B64C 13/0423* (2018.01); *B64C 13/12* (2013.01); *B64C 13/507* (2018.01); *G05D 1/0077* (2013.01); *G05D 1/0808* (2013.01); *G07C 5/0808* (2013.01)

(56) References Cited

U.S. PATENT DOCUMENTS

| | | | | |
|---|---|---|---|---|
| 5,868,359 A | * | 2/1999 | Cartmell | B64C 13/22 244/197 |
| 5,900,710 A | * | 5/1999 | Gautier | B64C 13/503 244/223 |
| 6,913,226 B2 | * | 7/2005 | Huynh | B64C 13/30 244/75.1 |
| 8,365,241 B1 | | 1/2013 | Gunda | |
| 2005/0022590 A1 | * | 2/2005 | Huynh | G01L 5/22 73/170.02 |

OTHER PUBLICATIONS

Extended European Search Report dated Jul. 18, 2017 in European Application No. 17153082.7.

* cited by examiner

500

502
coupling a first shaft to a second shaft of a primary flight control system and coupling a first shaft to a second shaft of an alternate flight control system

504
coupling a position transducer to each shaft of the primary and alternate flight control system

506
connecting the flight control unit in electrical communication with each of the position transducers

FIG. 5

METHOD AND APPARATUS FOR LATENT FAULT DETECTION AND MANAGEMENT FOR FLY-BY-WIRE FLIGHT CONTROL SYSTEMS

BACKGROUND

Field of the Disclosure

The present disclosure relates generally to a fly-by-wire aircraft control system, and more particularly, to a flight control system configured to detect a failure of a pilot or co-pilot flight control system.

Description of Related Art

A majority of commercial aircraft utilize fly-by-wire flight control systems that no longer include direct mechanical linkages to physically connect flight deck controllers with aircraft flight control surfaces. Rather, a pilot provides an input to the flight deck controller, which is subsequently converted to an electrical signal. The electrical signal is then electronically processed to generate commands to control units that appropriately orient the respective aircraft flight control surface.

Regulations governing the operation of certain aircraft require redundancies in flight control systems to satisfy safety requirements. Additionally, if a flight control system incurs a failure that is not detected (i.e., a latent failure), and a subsequent failure in the flight control system would impact the aircraft safety, then a mandatory ground inspection and/or a series of inspection intervals may be required to check and resolve the latent failure. In some instances, entire flight control systems are removed and replaced with new systems when a latent failure cannot be detected, which increases operating costs and decreases operational tempo.

SUMMARY

A fly-by-wire aircraft control system includes a pilot flight control system and an co-pilot flight control system. Each flight control system includes a first shaft that is mechanically coupled to a second shaft. Additionally, the first shaft is displaced apart from the second shaft. Each shaft of the pilot and co-pilot flight control system defines an independent longitudinal axis, and each shaft is configured to rotate about the longitudinal axis defined thereby. In some aspects, the pilot and co-pilot flight control systems each include a connecting link that enables rotation of one of the first shafts to rotate a corresponding one of the second shafts.

According to some aspects, the aircraft control system further includes a position transducer mechanically coupled to each shaft. The position transducers are configured to communicate an electrical signal corresponding to the rotation of the respective shaft. Additionally, the aircraft control system includes a flight control unit in electrical communication with each of the position transducers. The flight control unit is configured to receive the electrical signal from each of the position transducers. The health of the position transducers affects the flight safety, and as such, the ability to predict and/or determine mechanical and/or electrical failures of the position transducers and other components of the flight control system significantly increases the safety of flight operations.

Additionally, the flight control unit is configured to detect a failure of the pilot or co-pilot flight control system by detecting differences in the electrical signals from the position transducers. In some aspects, the flight control unit is configured to communicate the electrical signal from the operational position transducer to a flight control surface actuation system to compensate for the detected failure.

Aspects of the present disclosure also provide a method of controlling a fly-by-wire aircraft control system. The method includes receiving an electrical signal from a plurality of position transducers. Each position transducer is coupled to one of a first shaft and a second shaft of a pilot flight control system and a first shaft and a second shaft of an co-pilot flight control system. The first and second shafts define independent longitudinal axis and are rotatable about their respective independent longitudinal axes. Additionally, a connecting link enables rotation of one of the shafts to rotate a corresponding one of the connected shafts. The method further includes detecting a failure of the pilot or co-pilot flight control systems by detecting differences in the electrical signals received from each of the position transducers. According to some aspects, the method includes communicating the electrical signal from the position transducer to a flight control surface actuation system to compensate for the detected failure.

According to some aspects, an aircraft control system is provided that includes a pilot and an co-pilot flight control system. Each flight control system includes a first shaft mechanically coupled to and displaced apart from a second shaft. The shafts of the pilot and co-pilot flight control systems each define independent longitudinal axes and are rotatable about their respective longitudinal axes. Additionally, a pilot and an co-pilot connecting link respectively enable rotation of one of the first shafts to rotate a corresponding one of the second shafts of the pilot and co-pilot flight control systems. The aircraft control system further includes a pilot and co-pilot flight deck controllers that are mechanically coupled to the respective first pilot and co-pilot shafts. Further, the system includes a position transducer mechanically coupled to each shaft. The position transducer is configured to communicate an electrical signal corresponding to the rotation of the respective shaft. In some aspects, the system includes a pilot and an co-pilot wheel pulley mechanically coupled to the respective pilot and co-pilot flight deck controllers. The pilot and co-pilot wheel pulleys are configured to, in response to a failure of one of the connecting links, rotate the respective first shafts of the pilot and co-pilot flight control systems. According to some aspects, the system further includes a flight control unit that is in communication with the position transducers. The flight control unit is configured to (a) receive the electrical signal from each of the position transducers, (b) detect a failure of the pilot or co-pilot flight control system by detecting differences in the electrical signals from the position transducers, and (c) communicate the electrical signal from the position transducer to a flight control surface actuation system to compensate for the detected failure.

BRIEF DESCRIPTION OF THE DRAWING(S)

Having thus described example implementations of the disclosure in general terms, reference will now be made to the accompanying drawings, which are not necessarily drawn to scale, and wherein:

FIG. 5 illustrates a block diagram of a method of manufacturing a fly-by-wire aircraft control system according to one aspect of the present disclosure.

DETAILED DESCRIPTION

Figure 1:
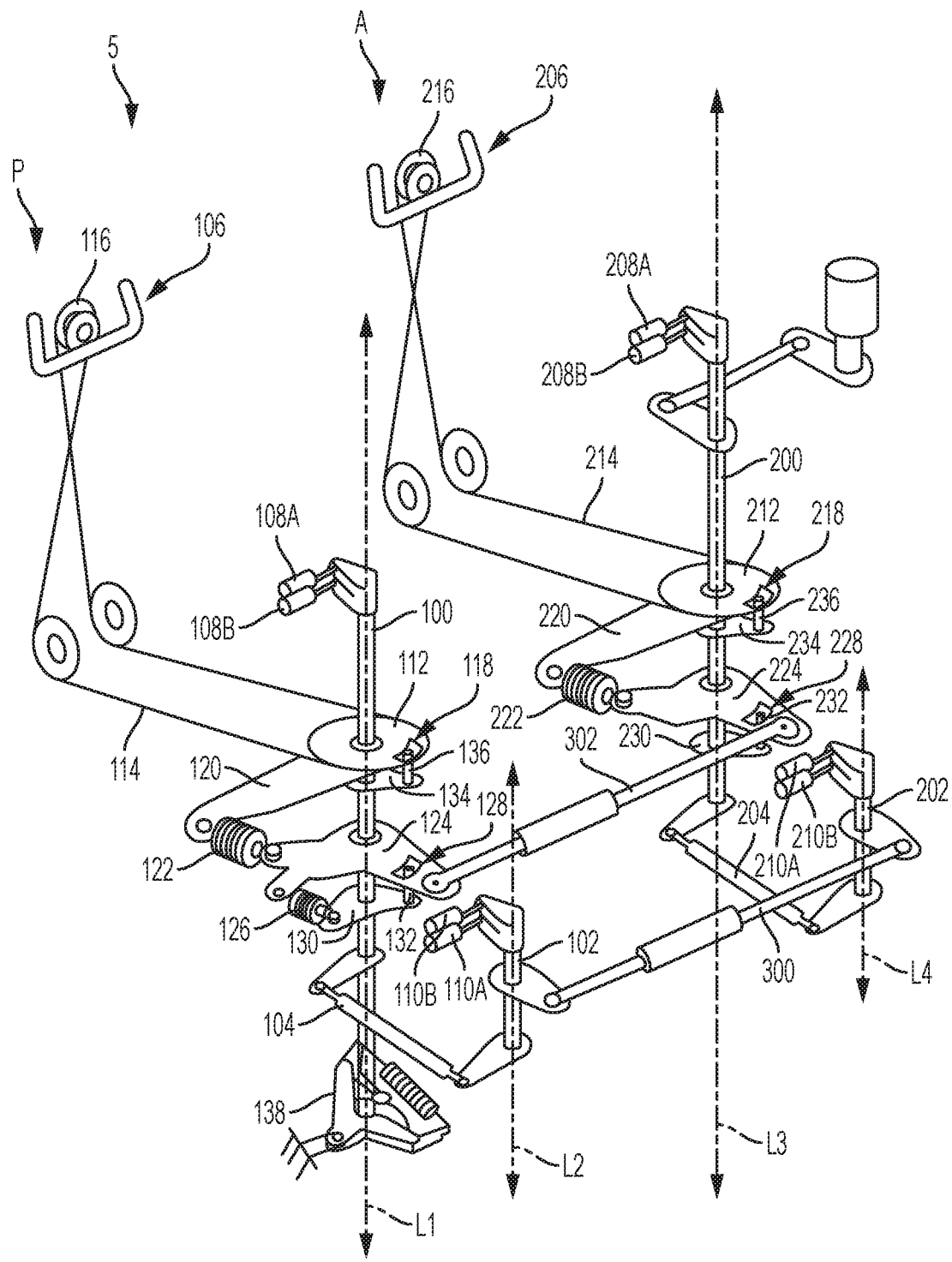
FIG. 1 illustrates a fly-by-wire aircraft control system that includes a pilot and co-pilot wheel flight deck controller according to one aspect of the present disclosure.

Some implementations of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. As used herein, the term "and/or" and the "/" symbol includes any and all combinations of one or more of the associated listed items. Further, unless otherwise indicated, something being described as being a first, second or the like should not be construed to imply a particular order. It should be understood that the terms first, second, etc. may be used herein to describe various steps, calculations, positions and/or the like, these steps, calculations or positions should not be limited to these terms. These terms are only used to distinguish one operation, calculation, or position from another. For example, a first position may be termed a second position, and, similarly, a second step may be termed a first step, without departing from the scope of this disclosure. Additionally, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Figure 2:
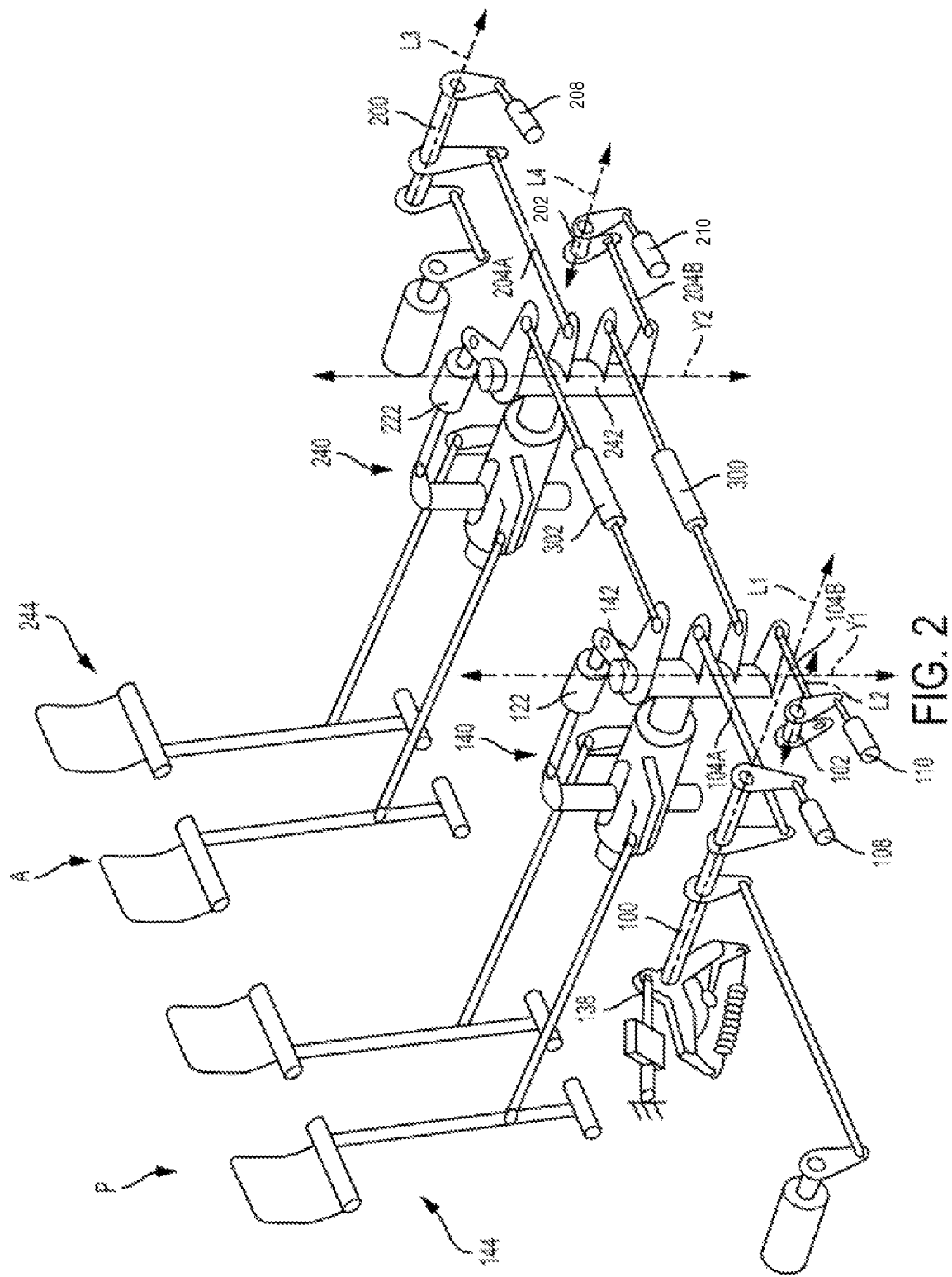
FIG. 2 illustrates a fly-by-wire aircraft control system that includes a pilot and co-pilot pedal flight deck controller according to one aspect of the present disclosure.
Figure 3:
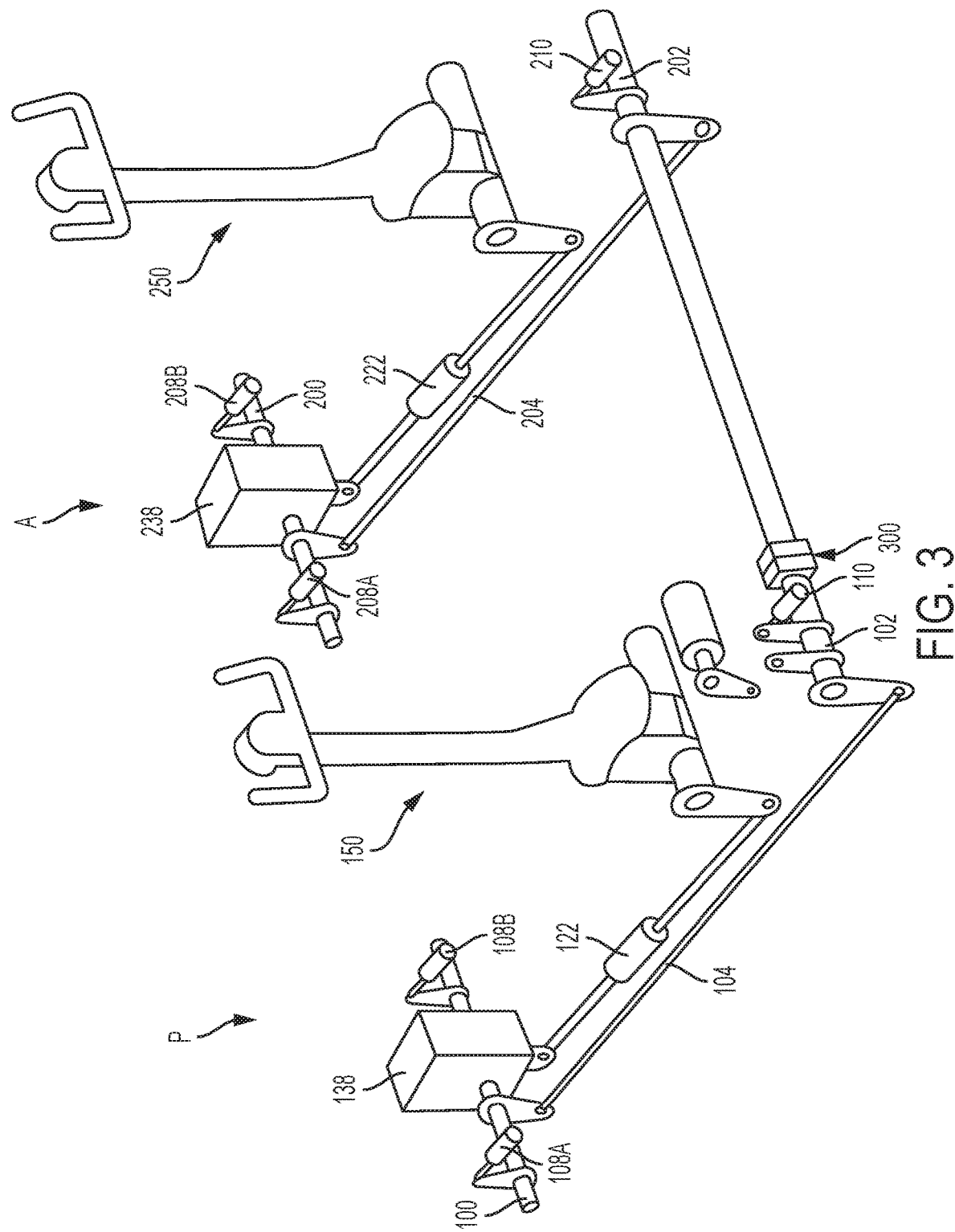
FIG. 3 illustrates a fly-by-wire aircraft control system that includes a pilot and co-pilot column flight deck controller according to one aspect of the present disclosure.

Implementations of the present disclosure provide for a fly-by-wire aircraft control system configured to control the operation of aircraft flight control surfaces and detect a failure of a flight control system. The fly-by-wire aircraft control system 5 can include a combination of mechanical and electrical components configured to control the operation of the aircraft flight control surfaces. Referring to FIGS. 1, 2 and 3, an aircraft control system 5 includes a pilot flight control system P (i.e., a primary flight control system) and a co-pilot flight control system A (i.e., an alternate flight control system). In particular, the pilot flight control system P may be arranged with respect to the co-pilot flight control system A such that a pilot and co-pilot may operate the respective pilot and co-pilot flight control systems P, A. Additionally, the pilot flight control system P and the co-pilot flight control system A may each include a respective flight deck controller (e.g., a pilot flight deck controller and an co-pilot flight deck controller). As shown in FIGS. 1, 2, and 3, the flight deck controllers may include a traditional wheel flight deck controller, column flight deck controller, and/or pedal flight deck controller configured to receive a user input to control the operation of the corresponding aircraft flight control surfaces.

According to some aspects, the pilot and co-pilot flight control systems P, A may each include a respective first shaft (e.g., a first pilot shaft 100 and a first co-pilot shaft 200). Additionally, the first shafts of the respective pilot and co-pilot flight control systems may be mechanically coupled to the corresponding flight deck controller. For example, as shown in FIG. 1, a first pilot shaft 100 is mechanically coupled to the pilot wheel flight deck controller 106, and a first co-pilot shaft 200 is mechanically coupled to the co-pilot wheel flight deck controller 206. The first pilot shaft 100 defines a longitudinal axis L1, and the first pilot shaft 100 is configured to rotate about the longitudinal axis L1. Likewise, the first co-pilot shaft 200 defines a longitudinal axis L3, and the first co-pilot shaft 200 is configured to rotate about the longitudinal axis L3.

Additionally, the pilot and co-pilot flight control systems P, A each include a respective second shaft 102, 202 that is mechanically coupled to the respective first pilot shaft 100 and the first co-pilot shaft 200. The second pilot shaft 102 is displaced apart from the first pilot shaft 100, and the second co-pilot shaft 202 is displaced apart from the first co-pilot shaft 200. According to some aspects, the second pilot shaft 102 is displaced apart from the longitudinal axis L1 defined by the first pilot shaft 100. For example, a second pilot shaft 102 defines a longitudinal axis L2 along which the second pilot shaft 102 extends. The longitudinal axis L2 of the second pilot shaft 102 may be parallel to, but displaced from, the longitudinal axis L1 of the first pilot shaft 100. As shown in FIG. 1, the second pilot shaft 102 may be nonconcentrically displaced from the first pilot shaft 100. According to another aspect, the respective longitudinal axes of the first and second pilot shaft may be coaxially arranged with respect to one another, but the first and second pilot shafts remain displaced apart from one another. Likewise, the second co-pilot shaft 202 may define a longitudinal axis L4 along which the second co-pilot shaft 202 extends, and the second co-pilot shaft 202 may be displaced apart from the longitudinal axis L3 defined by the first co-pilot shaft 200. In some aspects, the first and second shafts of the respective pilot and co-pilot flight control systems are mass balanced and are configured to not rotate without input from a flight deck controller and/or by induced dynamics.

According to some aspects, the pilot and co-pilot flight control systems P, A may further include a connecting link arranged such that for rotation of one of the first shafts of the pilot and co-pilot flight control systems correspondingly rotates the respective second shaft. For example, as shown in FIG. 1, a first pilot connecting rod 104 may have a first end mechanically coupled to the first pilot shaft 100 and an opposing second end mechanically coupled to the respective second pilot shaft 102. Likewise, a first co-pilot connecting rod 204 may have a first end mechanically coupled to the first co-pilot shaft 200 and an opposing second end mechanically coupled to the second co-pilot shaft 202.

In some aspects, the second pilot shaft 102 is mechanically coupled to the first pilot shaft 100 such that rotation of the first pilot shaft 100 about the longitudinal axis L1 thereof causes corresponding rotation of the second pilot shaft 102 about the longitudinal axis L2 defined thereby. As one of the first and second pilot shafts 100, 102 rotates about its respective longitudinal axis, the first pilot connecting rod 104 is displaced and causes corresponding rotation of the other connected pilot shaft about the longitudinal axis defined thereby. Likewise, when one of the first and second co-pilot shafts 200, 202 rotates about its respective longitudinal axis, the first co-pilot connecting rod 204 causes corresponding rotation of the other connected pilot shaft about the longitudinal axis defined thereby.

According to some aspects, each of the first and second pilot shafts 100, 102 may be mechanically coupled to a respective position transducer 108A, 108B, 110A, 110B. In particular, the pilot flight control system P may include a pair of position transducers 108A, 108B mechanically coupled to the first pilot shaft 100 and a pair of position transducers 110A, 110B mechanically coupled to the second pilot shaft 102. The first pilot position transducers 108A, 108B are configured to generate an electrical signal corresponding to the rotation of the first pilot shaft 100 about the longitudinal axis L1 thereof and communicate the electrical signal to a flight control unit. The second pilot position transducers 110A, 110B are configured to generate an electrical signal corresponding to the rotation of the second pilot shaft 102 about the longitudinal axis L2 thereof and communicate the electrical signal to the flight control unit.

Likewise, each of the first and second co-pilot shafts 200, 202 may be mechanically coupled to a respective position transducer 208A, 208B, 210A, 210B. The co-pilot flight control system A includes a pair of position transducers 208A, 208B mechanically coupled to the first co-pilot shaft 200 and a pair of position transducers 210A, 210B mechanically coupled to the second co-pilot shaft 202. The transducers 208A, 208B, 210A, 210B are configured to generate an electrical signal corresponding to the rotation of the respective first and second co-pilot shafts 200, 202 about their respective longitudinal axis L3, L4 and communicate the respective electrical signals to the flight control unit, as described in greater detail herein.

Figure 4:
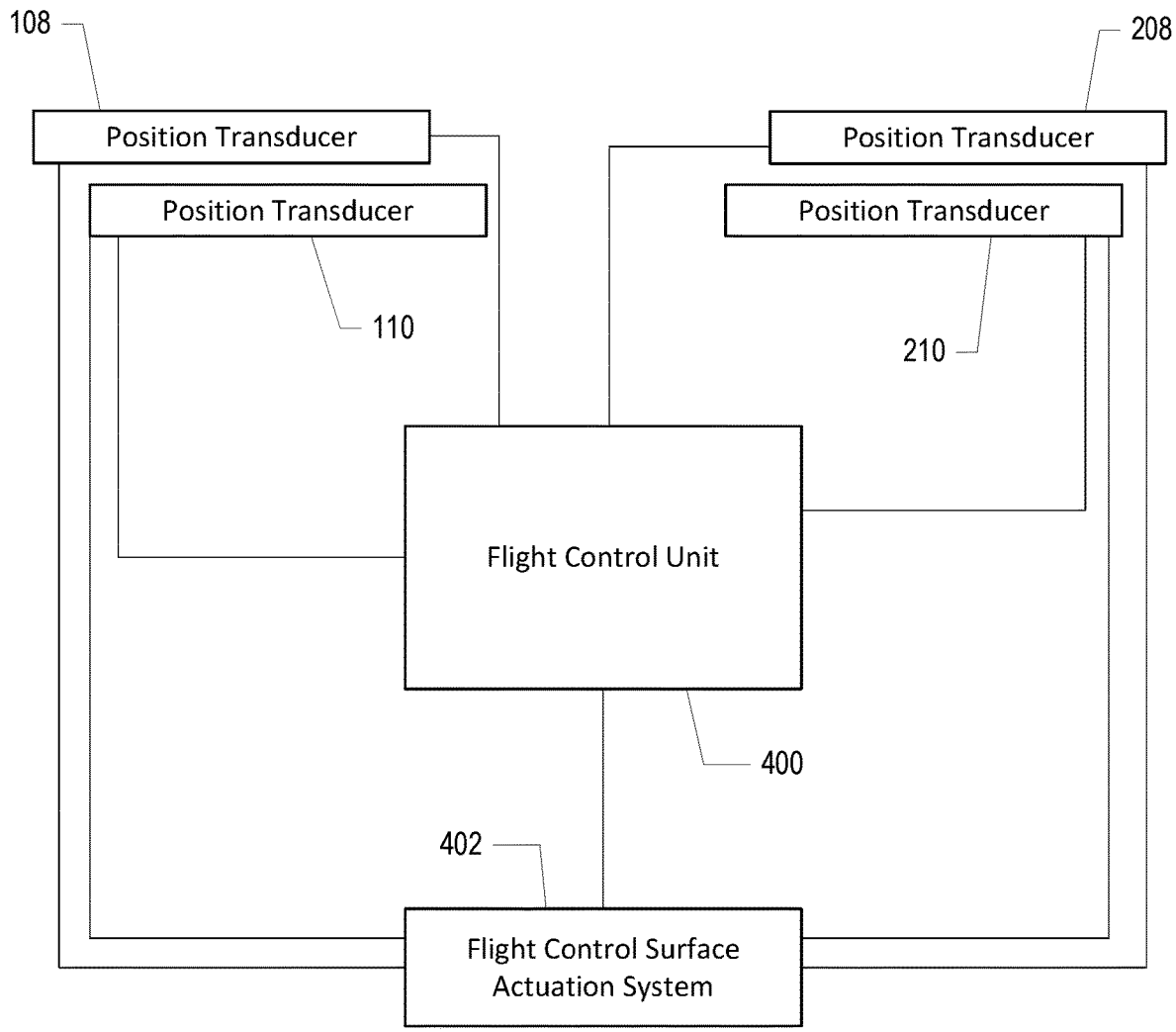
FIG. 4 illustrates a schematic block diagram of a fly-by-wire aircraft control system according to one aspect of the present disclosure.

Referring to FIG. 4, the fly-by-wire aircraft control system 5 further includes a flight control unit 400 that is in electrical communication with each of the position transducers 108, 110, 208, 210. Additionally, the flight control unit is configured to receive an electrical signal from any of the position transducers 108, 110, 208, 210 for controlling the operation of a corresponding flight control surface actuation system 402 in accordance with the rotation of the corresponding shaft mechanically coupled to the respective position transducer. Additionally, the flight control unit 400 is configured to communicate the electrical signal from any of the position transducers 108, 110, 208, 210 to the corresponding flight control surface actuation system 402 to compensate for the detected failure. In some aspects, the flight control unit 400 may be configured to process the electrical signal received from each of the position transducers and compare the electrical signals. Additionally, in response to a failure of the flight control unit 400, any one of the operational position transducers 108, 110, 208, 210 may be configured to provide an electrical signal to the flight control surface actuation system 402. In some aspects, the flight control surface actuation system 402 may include actuator control electronics configured to control, for example, electro-hydraulic servo actuators that manipulate flight control surfaces such as, for example, elevator control surfaces, ailerons, spoilerons, flaps, rudders and/or the like.

According to some aspects, the flight control unit 400 is further configured to detect a failure of the pilot flight control system P or the co-pilot flight control system A, based in part to the electrical signals received from the position transducers 108, 110, 208, 210. For example, the flight control unit 400 is configured to compare the electrical signals received from any one of the first pilot position transducer 108, the second pilot position transducer 110, the first co-pilot position transducer 208, and the second co-pilot position transducer 210 with the electrical signals received from any of the other position transducers. In comparing the electrical signals received from the position transducers 108, 110, 208, 210, the flight control unit 400 detects a failure in the pilot flight control system P or the co-pilot flight control system A by detecting a difference between the electrical signals provided by any of the position transducers 108, 110, 208, 210.

Additionally, in response to detecting a failure of one of the pilot flight control system P or co-pilot flight control system A, the flight control unit 400 is configured to provide an electrical signal to a flight control surface actuation system 402 associated with the position transducers 108, 110, 208, 210. In particular, the flight control unit 400 is configured to communicate an electrical signal from at least one of the operational position transducers to the flight control surface actuation system 402 so as to compensate for the detected failure.

In some aspects, the wheel flight deck controllers 106, 206 of the pilot and co-pilot flight control systems P, A may be configured to rotate the respective first pilot and co-pilot shafts 100, 200. For example, as shown in FIG. 1, the pilot wheel flight deck controller 106 may be configured to rotate the first pilot shaft 100 about the longitudinal axis L1 defined thereby, and the co-pilot wheel flight deck controller 206 may be configured to rotate the first co-pilot shaft 200 about the longitudinal axis L3. For example, rotating the pilot wheel flight deck controller 106 in either the clockwise or counterclockwise direction provides for the first pilot shaft 100 to correspondingly rotate in a respective direction about the longitudinal axis L1 defined thereby. Likewise, rotating the co-pilot wheel flight deck controller 206 in either the clockwise or counterclockwise direction provides for the first co-pilot shaft 200 to correspondingly rotate in a respective direction about the longitudinal axis L3.

The aircraft control system 5 may further include a pilot flight data recorder force transducer 122 and an co-pilot flight data recorder force transducer 222. The flight data recorder force transducers 122, 222 may be mechanically coupled to the respective pilot and co-pilot flight deck controllers. For example, as shown in FIG. 3, the pilot flight data recorder force transducer 122 is directly coupled to the pilot column flight deck controller 150, and the co-pilot flight data recorder force transducer 22 is directly coupled to the co-pilot column flight deck controller 250. The flight data recorder force transducers 122, 222 may be configured to provide an output, typically voltage or current, that is proportional to the input force provided to the pilot and co-pilot flight deck controllers by the pilot and the co-pilot respectively. As such, the flight data recorder force transducers 122, 222 may be configured to measure the relative position of the magnetic core and windings, which is proportional to the force applied to the respective flight deck controllers (e.g., the pilot and co-pilot wheel flight deck controllers 106, 206; the pilot and co-pilot pedal flight deck controllers 144, 244; the pilot and co-pilot column flight deck controllers 150, 250). Additionally, the flight data recorder force transducers 122, 222 may be configured to communicate an electrical signal to the flight control unit corresponding to the input force applied to the respective flight deck controllers.

In some aspects, the aircraft control system further includes at least one linkage mechanically coupling one of the pilot shafts 100, 102 to one of the co-pilot shafts 200, 202 such that rotation of one of the pilot shafts 100, 102 about the longitudinal axis thereof L1, L2 causes corresponding rotation of the coupled one of the co-pilot shafts 200, 202 about the longitudinal axis thereof L3, L4. For example, as shown in FIG. 1, a first end of a first coupling rod 300 is mechanically coupled to the second pilot shaft 102 and an opposing second end of the first coupling rod 300 is mechanically coupled to the second co-pilot shaft 202. As the second pilot shaft 102 rotates about its longitudinal axis L2, the first coupling rod 300 correspondingly rotates the second co-pilot shaft 202 about its longitudinal axis L4. In particular, the ends of the first coupling rod 300 are directly coupled to the respective second pilot shaft 102 and second co-pilot shaft 202 such that any rotation of either second shaft 102, 202 displaces the first coupling rod 300 and thereby causes the other coupled second shaft 102, 202 to correspondingly rotate.

According to some aspects, the flight control system 5 may include a second coupling rod 302. For example, as shown in FIG. 1, a first end of a second coupling rod 302 is mechanically coupled to the first pilot shaft 100, and the opposing second end of the second coupling rod 302 is mechanically coupled to the first co-pilot shaft 200 via respective linkages. As the pilot shafts 100, 102 and the co-pilot shafts 200, 202 are mechanically coupled to one another by either the first or second coupling rods 300, 302, rotation in any one of the pilot shafts 100, 102 provides for corresponding rotation in any one of the coupled co-pilot shafts 200, 202.

According to some embodiments, the aircraft control system 5 may further include a feel and centering unit 138. As shown in FIG. 1, the feel and centering unit 138 may be mechanically coupled to the first pilot shaft 100. The feel and centering unit 138 may be configured to provide a counterforce that progressively resists the rotation of the first pilot shaft 100 from a null or registration position as a force is applied to the pilot and/or co-pilot flight deck controllers to rotate the first pilot shaft 100 in either the clockwise or counterclockwise directions. Additionally, the registration position of the first pilot shaft 100 may correspond with the flight deck controllers being disposed in a null or registration position. In some aspects, the aircraft control system 5 may include a pilot feel and centering unit 138 mechanically coupled to the first pilot shaft 100 and an co-pilot feel and centering unit 238 mechanically coupled to the first co-pilot shaft 200.

Referring back to FIG. 1, the aircraft control system 5 is configured to control angular displacement (i.e., roll) of the aircraft about a longitudinal axis defined thereby that extends from the nose to the tail of the aircraft. In particular, the pilot wheel flight deck controller 106 and the co-pilot wheel flight deck controller 206 are mechanically coupled to the first pilot and co-pilot shafts 100, 200 respectively. In some aspects, the pilot wheel flight deck controller 106 may be mechanically coupled to the first pilot shaft 100 via a pilot wheel pulley 112. The pilot flight control system P may also include an endless cable 114 that is guided by the pilot wheel pulley 112 and a second pulley 116 associated with the pilot wheel flight deck controller 106. The second pulley 116 may be configured to rotate correspondingly with the pilot wheel flight deck controller 106 in both of the clockwise and counterclockwise directions. Rotation of the pilot wheel pulley 112 about the longitudinal axis L1 of the first pilot shaft 100 provides for the pilot wheel flight deck controller 106 to rotate correspondingly via the endless cable 114 and the pulley 116 associated with the pilot wheel flight deck controller 106.

According to some aspects, the first pilot shaft 100 extends through the center of the pilot wheel pulley 112, and the pilot wheel pulley 112 may be rotatable about the first pilot shaft 100. Additionally, the pilot wheel pulley 112 may define an arcuate slot 118 proximate a peripheral portion of the pilot wheel pulley 112.

According to some aspects, the pilot flight control system P may include a pilot flight data recorder linkage 120 having a first end securely attached to the pilot wheel pulley 112 and/or endless cable 114. The pilot flight data recorder linkage 120 may also extend substantially radially from the first pilot shaft 100 and may extend from the first end, which is securely attached to the pilot wheel pulley 112 and/or endless cable 114, to an opposing second end that is directly coupled to a first end of a pilot flight data recorder force transducer 122.

In some aspects, the pilot flight control system may include a pilot force transducer linkage 124. Like the pilot wheel pulley 112, the pilot force transducer linkage 124 is also rotatable about the first pilot shaft 100. Additionally, the pilot force transducer linkage 124 may also define an arcuate slot 128 (e.g., a kidney slot) that is aligned with the arcuate slot 118 of the pilot wheel pulley 112 along a direction parallel to the first pilot shaft 100. For example, the pilot force transducer linkage 124 may be axially displaced from the pilot wheel pulley 112 along the first pilot shaft 100 such that the arcuate slot 128 of the pilot force transducer linkage 124 is aligned with the arcuate slot 118 of the pilot wheel pulley 112 along a direction parallel to the first pilot shaft 100. In some aspects, a second end of the pilot flight data recorder force transducer 122 is coupled to a pilot force transducer linkage 124.

As previously mentioned, the pilot wheel pulley 112 and the pilot force transducer linkage 124 are both rotatable about the first pilot shaft 100. The coupling of the pilot flight data recorder force transducer 122 to the pilot flight data recorder linkage 120 at a first end and to the pilot force transducer linkage 124 at the opposing second end provides for the pilot wheel pulley 112 and the pilot force transducer linkage 124 to correspondingly rotate about the first pilot shaft 100. According to some aspects, the pilot force transducer linkage 124 may also be mechanically coupled to a bank angle protection force transducer 126. In particular, a first end of the bank angle protection (BAP) force transducer 126 may be securely attached to the pilot force transducer linkage 124. The BAP force transducer 126 may also be configured as a LVDT like the pilot flight data recorder force transducer 122.

An opposing second end of the BAP force transducer 126 may be securely attached to a first pilot deadzone linkage 130. According to some aspects, the pilot flight control system P may include a first pilot deadzone linkage 130 and a second pilot deadzone linkage 134 that are both non-rotatably attached to the first pilot shaft 100. Further, the first and second pilot deadzone linkages 130, 134 may extend radially from the first pilot shaft 100. In some aspects, each of the first and second pilot deadzone linkages 130, 134 may include a first and second pilot deadzone engaging element 132, 136 respectively that extends therefrom. In particular, the first pilot deadzone engaging element 132 and the second pilot deadzone engaging element 136 may extend from the first pilot deadzone linkage 130 and the second pilot deadzone linkage 134 respectively along a direction parallel to the longitudinal axis of the first pilot shaft 100.

Additionally, the first pilot deadzone linkage 130 may be axially displaced from the pilot force transducer linkage 124 along the first pilot shaft 100. The second pilot deadzone linkage 134 may also be axially displaced along the first pilot shaft 100 from the pilot wheel pulley 112. According to some aspects, the first pilot deadzone engaging element 132 may extend from the first pilot deadzone linkage 130 along a direction parallel to the longitudinal axis L1 of the first pilot shaft 100 and through the arcuate slot 128 of the pilot force transducer linkage 124. Further, the second pilot engaging element 136 may extend from the second pilot deadzone linkage 134 along a direction parallel to the longitudinal axis L1 of the first pilot shaft 100 and through the arcuate slot 118 of the pilot wheel pulley 112. As the arcuate slots 118, 128 of the pilot wheel pulley 112 and the pilot force transducer linkage 124 are aligned with one another, the first and second deadzone engaging elements 132, 136 may be coaxially aligned.

Accordingly, as the first pilot deadzone linkage 132 is non-rotatably attached to the first pilot shaft 100, rotation of the first pilot shaft 100 provides for the first pilot deadzone engaging element 132 to orbit the first pilot shaft 100 in a direction corresponding with the rotation of the first pilot shaft 100. Likewise, as the second pilot deadzone linkage 134 is also non-rotatably attached to the first pilot shaft 100, rotation of the first pilot shaft 100 provides for the second pilot deadzone engaging element 136 to orbit the first pilot shaft 100 in a direction corresponding with the rotation of the first pilot shaft 100. In some aspects, the first pilot deadzone engaging element 132 orbiting the first pilot shaft 100 may provide for the first pilot deadzone engaging element 132 to engage and/or contact an end of the arcuate slot 128 defined by the pilot force transducer linkage 124. Additionally, the rotation of the first pilot shaft 100 may provide for the second pilot deadzone engaging element 136 to orbit the first pilot shaft 100 and to engage and/or contact an end of the arcuate slot 118 defined by the pilot wheel pulley 112.

Likewise, the co-pilot flight control system A may include an co-pilot wheel pulley 212 that is mechanically coupled to the co-pilot wheel flight deck controller 206. Additionally, the co-pilot wheel flight deck controller 206 may be mechanically coupled via the co-pilot wheel pulley 212. Further, the co-pilot flight control system A includes an endless cable 214 that is guided by the co-pilot wheel pulley 212 and a second pulley 216 associated with the co-pilot wheel flight deck controller 206. The second pulley 216 may be configured to rotate correspondingly with the co-pilot wheel flight deck controller 206 in both the clockwise or counterclockwise directions. As discussed herein, rotation of the co-pilot wheel pulley 212 about the longitudinal axis L3 of the first co-pilot shaft 200 provides for the co-pilot wheel flight deck controller 206 to rotate correspondingly via the endless cable 214 and the second pulley 216 associated with the co-pilot wheel flight deck controller 206.

As the first pilot shaft 100 extends through the center of the pilot wheel pulley 112, the first co-pilot shaft 200 extends through the center of the co-pilot wheel pulley 212. Additionally, the co-pilot wheel pulley 212 may be rotatable about the first co-pilot shaft 200. In some aspects, the co-pilot wheel pulley 212 may define an arcuate slot 218 proximate a peripheral portion of the co-pilot wheel pulley 212.

According to some aspects, the co-pilot flight control system A may include an co-pilot flight data recorder linkage 220 having a first end securely attached to the co-pilot wheel pulley 212 and/or the endless cable 214. The co-pilot flight data recorder linkage 220 may also extend radially from the first co-pilot shaft 200 and the first end, which is securely attached to the co-pilot wheel pulley 212, to an opposing second end. The opposing second end of the co-pilot flight data recorder linkage 220 may be coupled to a first end of an co-pilot flight data recorder force transducer 222.

In some aspects, the co-pilot flight control system A may include an co-pilot force transducer linkage 224. Like the co-pilot wheel pulley 212, the co-pilot force transducer linkage 224 may also be rotatable about the first co-pilot shaft 200. Additionally, the co-pilot force transducer linkage 224 may also define an arcuate slot 228 that is aligned with the arcuate slot 218 of the co-pilot wheel pulley 212 along a direction parallel to the longitudinal axis L3 of the first co-pilot shaft 200. For example, the co-pilot force transducer linkage 224 may be axially displaced from the co-pilot wheel pulley 212 along the first co-pilot shaft 200 such that the arcuate slot 228 of the co-pilot force transducer linkage 224 is aligned with the arcuate slot 218 of the co-pilot wheel pulley 212 along a direction parallel to the longitudinal axis L3 of the first co-pilot shaft 200.

Additionally, a second end of the co-pilot flight data recorder force transducer 222, which is opposed to the first end that is mechanically coupled to the co-pilot flight data recorder linkage 220, may be coupled to the co-pilot force transducer linkage 224. As previously mentioned, the co-pilot wheel pulley 212 and the co-pilot force transducer linkage 224 are both rotatable about the first co-pilot shaft 200. In some aspects, the mechanical coupling of the co-pilot flight data recorder force transducer 222 to the co-pilot force transducer linkage 224 and the co-pilot flight data recorder linkage 220 provides for the co-pilot wheel pulley 212 and the co-pilot force transducer linkage 224 to correspondingly rotate about the first co-pilot shaft 200. In particular, the co-pilot flight data recorder linkage 220 being securely attached to the co-pilot wheel pulley 212 at a first end and being mechanically coupled to the co-pilot flight data recorder force transducer 222 at the opposing second end provides for a rotation of the co-pilot wheel pulley 212 about the first co-pilot shaft 200 to translate to the co-pilot force transducer linkage 224 via the co-pilot flight data recorder force transducer 222.

According to some aspects, the co-pilot flight control system A may include a first co-pilot deadzone linkage 230 and a second co-pilot deadzone linkage 234 that are both non-rotatably attached to the first co-pilot shaft 200. Further, the first and second co-pilot deadzone linkages 230, 234 may extend radially from the first co-pilot shaft 200. In some aspects, each of the first and second co-pilot deadzone linkages 230, 234 may include a first and second co-pilot deadzone engaging element 232, 236 respectively that extends therefrom. In particular, the first co-pilot deadzone engaging element 232 may extend from the first co-pilot deadzone linkage 230, and the second co-pilot deadzone engaging element 236 may extend from the second co-pilot deadzone linkage 234 along a direction parallel to the longitudinal axis L3 of the first co-pilot shaft 200.

Additionally, the first co-pilot deadzone linkage 230 may be axially displaced from the co-pilot force transducer linkage 224 along the first co-pilot shaft 200. The second co-pilot deadzone linkage 234 may also be axially displaced along the first co-pilot shaft 200 from the co-pilot wheel pulley 212. According to some aspects, the first co-pilot deadzone engaging element 232 may extend from the first co-pilot deadzone linkage 230 along a direction parallel to the longitudinal axis L3 of the first co-pilot shaft 200 and through the arcuate slot 228 of the co-pilot force transducer linkage 224. Further, the second co-pilot engaging element 236 may extend from the second co-pilot deadzone linkage 234 along a direction parallel to the longitudinal axis L3 of the first co-pilot shaft 200 and through the arcuate slot 218 of the co-pilot wheel pulley 212. As the arcuate slots 218, 228 of the co-pilot wheel pulley 212 and the co-pilot force transducer linkage 224 are aligned with one another, the first and second co-pilot deadzone engaging elements 232, 236 may also be aligned with one another. In some aspects, the first and second co-pilot deadzone engaging elements 232, 236 may be coaxially aligned with one another.

Accordingly, as the first co-pilot deadzone linkage 230 is non-rotatably attached to the first co-pilot shaft 200, rotation of the first co-pilot shaft 200 causes the first co-pilot deadzone engaging element 232 to orbit the first co-pilot shaft 200 in a direction corresponding with the rotation of the first co-pilot shaft 200. Likewise, as the second co-pilot deadzone linkage 234 is also non-rotatably attached to the first co-pilot shaft 200, rotation of the first co-pilot shaft 200 causes the second co-pilot deadzone engaging element 236 to orbit the first co-pilot shaft 200 in a direction corresponding with the rotation of the first co-pilot shaft 200. In some aspects, as the first co-pilot deadzone engaging element 232 orbits the first co-pilot shaft 200, the first co-pilot deadzone engaging element 232 may engage and/or contact an end of the arcuate slot 228 defined by the co-pilot force transducer linkage 224. Additionally, the rotation of the first co-pilot shaft 200 may cause for the second co-pilot deadzone engaging element 236 to orbit the first co-pilot shaft 200 and to engage and/or contact an end of the arcuate slot 218 defined by the co-pilot wheel pulley 212.

The pilot and co-pilot flight control systems P, A may also include at least one connecting link that causes rotation of one of the first shafts 100, 200 of the pilot and co-pilot flight control systems to correspondingly rotate the respective second shaft 200, 202. When the first pilot shaft 100 rotates about its longitudinal axis L1, the first pilot connecting rod 104 causes the second pilot shaft 102 to correspondingly rotate about its longitudinal axis L2. Accordingly, the pilot transducers 108A, 108B associated with the first pilot shaft 100 provide an electrical signal to the flight control unit that corresponds with the electrical signal provided by the pilot transducers 110A, 110B associated with the second pilot shaft 102. Likewise, when the first co-pilot shaft 200 rotates about its longitudinal axis L3, the first co-pilot connecting rod 204 causes the second co-pilot shaft 202 to correspondingly rotate about its longitudinal axis L4. As such, the co-pilot transducers 208A, 208B associated with the first co-pilot shaft 200 provide an electrical signal to the flight control unit that corresponds with the electrical signal provided by the co-pilot transducers 210A, 210B associated with the second co-pilot shaft 202.

In the event that the pilot flight data recorder force transducer 122 becomes decoupled from the pilot flight data recorder linkage 120 or the pilot force transducer linkage 124, the pilot may experience a loss in fidelity when providing an input force to the pilot wheel flight deck controller 106. In particular, the pilot rotates the pilot wheel flight deck controller 106 thereby causing the pilot wheel pulley 112 to rotate about the first pilot shaft 100 until an end of the arcuate slot 118 engages the second pilot deadzone engaging element 136. Once an end of the arcuate slot 118 engages the second pilot deadzone engaging element 136, the first pilot shaft 100 will then begin to rotate about the longitudinal axis L1. The flight control unit will receive electrical signals from each of the position transducers 108A, 108B, 110A, 110B, 208A, 208B, 210A, 210B that corresponds with the rotation of the respective shafts 100, 102, 200, 202 that are substantially equal to one another. However, the flight control unit will also receive an electrical signal from the pilot flight data recorder force transducer 122 indicating that the pilot flight data recorder force transducer 122 has become decoupled, and the flight control unit will generate an electrical signal that corresponds to a corrected control command to operate to the respective aircraft flight control surfaces.

Likewise, should the co-pilot flight data recorder force transducer 222 become decoupled from either of the co-pilot flight data recorder linkage 220 and/or the co-pilot force transducer linkage 224, the copilot will experience a loss in fidelity when providing an input force to the co-pilot wheel flight deck controller 206. The copilot rotates the co-pilot wheel flight deck controller 206 thereby causing the co-pilot wheel pulley 212 to rotate about the first co-pilot shaft 200 until an end of the arcuate slot 218 engages the second co-pilot deadzone engaging element 236. Once an end of the arcuate slot 218 engages the second co-pilot deadzone engaging element 236, the first co-pilot shaft 200 will then begin to rotate about the longitudinal axis L3. The flight control unit will receive electrical signals from each of the position transducers 108A, 108B, 110A, 110B, 208A, 208B, 210A, 210B that corresponds with the rotation of the respective shafts 100, 102, 200, 202 that are substantially equal to one another. However, the flight control unit will also receive an electrical signal from the co-pilot flight data recorder force transducer 222 indicating that the co-pilot flight data recorder force transducer 222 has become decoupled, and the flight control unit will generate an electrical signal that corresponds to a corrected control command to operate to the respective aircraft flight control surfaces.

In the event that the BAP force transducer 126 becomes decoupled from the pilot force transducer linkage 124 and/or the first pilot deadzone linkage 130, the pilot may experience a loss in fidelity when providing an input force to the pilot wheel flight deck controller 106. In particular, the pilot rotates the pilot wheel flight deck controller 106 thereby causing the pilot wheel pulley 112 to rotate. Rotation of the pilot wheel pulley 112 causes the flight data recorder linkage 120, which is mechanically coupled to a first end of the pilot flight data recorder force transducer 122, to rotate. The opposing second end of the pilot flight data recorder force transducer 122 is mechanically coupled to the pilot force transducer linkage 124, and thus the rotation of the pilot wheel pulley is translated to the pilot force transducer linkage 124 via the respective couplings. The pilot force transducer linkage 124 will rotate about the first pilot shaft 100 until an end of the arcuate slot 128 engages the first pilot deadzone engaging element 136, thereby causing the first pilot shaft 100 to rotate about its longitudinal axis L1. The flight control unit will receive electrical signals from each of the position transducers 108A, 108B, 110A, 110B, 208A, 208B, 210A, 210B that corresponds with the rotation of the respective shafts 100, 102, 200, 202 that are substantially equal to one another. However, the flight control unit will also receive an electrical signal from the BAP force transducer 126 indicating that the BAP force transducer 122 has become decoupled, and the flight control unit will generate an electrical signal that corresponds to a corrected control command to operate to the respective aircraft flight control surfaces.

Should the first pilot shaft 100 fail by, for example, shearing into separate pieces, the first pilot shaft 100 may become unresponsive to any input force and will cease to rotate about the longitudinal axis L1. Consequently, the position transducers 108A, 108B mechanically coupled to the first pilot shaft 100 will provide an electrical signal to the flight control unit that differs from the electrical signals provided to the flight control unit by the other position transducers 110A, 110B, 208A, 208B, 210A, 210B mechanically coupled to the respective second pilot shaft 102, first co-pilot shaft 200, and second co-pilot shaft 202. The co-pilot may still control the aircraft by rotating the co-pilot wheel flight deck controller 206. In particular, the copilot rotates the co-pilot wheel flight deck controller 206 thereby causing the co-pilot wheel pulley 212 to rotate about the first co-pilot shaft 200 until an end of the arcuate slot 218 engages the second co-pilot deadzone engaging element 236. Once an end of the arcuate slot 218 engages the second co-pilot deadzone engaging element 236, the first co-pilot shaft 200 will then begin to rotate about the longitudinal axis L3. Rotation of the first co-pilot shaft 200 will cause the first co-pilot connecting rod 204 to rotate the second co-pilot shaft 202. Additionally, rotation of the second co-pilot shaft 202 will cause the first coupling rod 300 to correspondingly rotate the second pilot shaft 102. Accordingly, the position transducers 110A, 110B, 208A, 208B, 210A, 210B mechanically coupled to the respective second pilot shaft 102, first co-pilot shaft 200, and second co-pilot shaft 202 will provide an electrical signal to the flight control unit that indicates the respective shafts are rotating in a corresponding manner, while the position transducers 108A, 108B coupled to the first pilot shaft 100 will provide an electrical signal that indicates that the first pilot shaft 100 has failed (i.e., the first pilot shaft 100 is not rotating). In response, the flight control unit may be configured to communicate the electrical signals from the operational position transducer 110A, 110B, 208A, 208B, 210A, 210B to the respective aircraft flight control surfaces to compensate for the detected failure. In another aspect, the flight control unit may determine that the electrical signals generated by the position transducers 108A, 108B associated with the first pilot shaft 100 do not correspond with the electrical signals generated by the other position transducers 110A, 110B, 208A, 208B, 210A, 210B, and the flight control unit may be configured to generate an electrical signal that corresponds to a corrected control command to operate the respective aircraft control surfaces.

Likewise, if the first co-pilot shaft 200 were to fail, for example, by shearing into separate pieces, the position transducers 208A, 208B associated with the first co-pilot shaft 200 will communicate an electrical signal to the flight control unit that differs from the electrical signals provided to the flight control unit by the other position transducers 108A, 108B, 110A, 110B, 210A, 210B mechanically coupled to the respective first pilot shaft 100, second pilot shaft 102, and second co-pilot shaft 202. In particular, the position transducers 108A, 108B, 110A, 110B, 210A, 210B mechanically coupled to the respective first pilot shaft 100, second pilot shaft 102, and second co-pilot shaft 202 will communicate an electrical signal to the flight control unit that indicates the respective shafts are rotating in a corresponding manner, while the position transducers 208A, 208B coupled to the first co-pilot shaft 200 will provide an electrical signal that indicates that the first co-pilot shaft 200 has failed (i.e., the first co-pilot shaft 200 is not rotating). In response, the flight control unit may be configured to communicate the electrical signals from the operational position transducer 108A, 108B, 110A, 110B, 210A, 210B to the respective aircraft flight control surfaces to compensate for the detected failure. In another aspect, the flight control unit may determine that the electrical signals generated by the position transducers 208A, 208B associated with the first co-pilot shaft 200 do not correspond with the electrical signals generated by the other position transducers 108A, 108B, 110A, 110B, 210A, 210B, and the flight control unit may be configured to generate an electrical signal that corresponds to a corrected control command to operate the respective aircraft control surfaces.

In the event that the first pilot connecting rod 104 becomes decoupled, the position transducers 108A, 108B mechanically coupled to the first pilot shaft 100 may communicate an electrical signal to the flight control unit that indicates the first pilot shaft 100 is not rotating in a corresponding manner with the second pilot shaft 102, the first co-pilot shaft 200, and/or the second co-pilot shaft 202. Accordingly, the pilot may provide an input to the pilot wheel flight deck controller 106 that causes the first pilot shaft 100 to rotate about the longitudinal axis L1, thereby causing the position transducers 108A, 108B coupled to the first pilot shaft 100 to communicate an electrical signal to the flight control unit corresponding to the rotation of the first pilot shaft 100. With the decoupling of the first pilot connecting rod 104, the second pilot shaft 102 will not correspondingly rotate with respect to the first pilot shaft 100. Rather, the rotation of the first pilot shaft 100 will cause the second coupling rod 302 to rotate the co-pilot force transducer linkage 224 about the first co-pilot shaft 200 until an end of the arcuate slot 228 defined by the co-pilot force transducer linkage 224 engages the first co-pilot deadzone engaging element 232. After the first co-pilot deadzone engaging element 232 engages an end of the arcuate slot 228, the first co-pilot shaft 200 will then begin to rotate about its longitudinal axis L3. Accordingly, the position transducers 208A, 208B will provide an electrical signal to the flight control unit that corresponds with the rotation of the first co-pilot shaft 200, which is offset from the rotation of the first pilot shaft 100. The flight control unit thereby determines that the midpoint values of the position transducers 108A, 108B, 110A, 110B of the pilot flight control system P are not equivalent to one another, and the flight control unit may be configured to generate an electrical signal that corresponds to a corrected control command to operate the respective aircraft control surfaces.

Likewise, if the first co-pilot connecting rod 204 were to become decoupled, the position transducers 208A, 208B mechanically coupled to the first co-pilot shaft 200 may communicate an electrical signal to the flight control unit that indicates the first co-pilot shaft 200 is not rotating in a corresponding manner with the second co-pilot shaft 202, the first pilot shaft 100, and/or the second pilot shaft 102. That is, the position transducers 210A, 210B, 108A, 108B, 110A, 110B associated with the respective second co-pilot shaft 202, first pilot shaft 100, and second pilot shaft 102 will communicate an electrical signal to the flight control unit that indicates the respective second co-pilot shaft 202, first pilot shaft 100, and second pilot shaft 102 are rotating differently from the first co-pilot shaft 200. In particular, rotation of the first pilot shaft 100 will cause the first pilot connecting rod 104 to correspondingly rotate the second pilot shaft 102. Additionally, the second pilot shaft 102 being mechanically coupled to the second co-pilot shaft 202 through the first coupling rod 300 will cause the second co-pilot shaft 202 to rotate in a corresponding manner with respect to the second pilot shaft 102. Further, the rotation of the first pilot shaft 100 will cause the second coupling rod 302 to rotate the co-pilot force transducer linkage 224 about the first co-pilot shaft 200 until an end of the arcuate slot 228 defined by the co-pilot force transducer linkage 224 engages the first co-pilot deadzone engaging element 232. After the first co-pilot deadzone engaging element 232 engages an end of the arcuate slot 228, the first co-pilot shaft 200 will then begin to rotate about its longitudinal axis L3. Accordingly, the position transducers 208A, 208B will provide an electrical signal to the flight control unit that corresponds with the rotation of the first co-pilot shaft 200, which is offset from the rotation of the first pilot shaft 100. The flight control unit thereby determines that the midpoint values of the co-pilot position transducers 208A, 208B, 210A, 210B of the co-pilot flight control system A are not equivalent to one another, and the flight control unit may be configured to generate an electrical signal that corresponds to a corrected control command to operate the respective aircraft control surfaces.

In the event that the second pilot shaft 102 fails, for example, by shearing into separate pieces, the position transducers 110A, 110B mechanically coupled to the second pilot shaft 102 may communicate an electrical signal to the flight control unit that differs from the electrical signals provided to the flight control unit by the other position transducers 108A, 108B, 208A, 208B, 210A, 210B mechanically coupled to the respective first pilot shaft 100, first co-pilot shaft 200, and second co-pilot shaft 202. For example, as the first pilot shaft 100 rotates about the longitudinal axis L1, the second coupling rod 302 causes the co-pilot force transducer linkage 224 to rotate about the first co-pilot shaft 200 until an end of the arcuate slot 228 defined by the co-pilot force transducer linkage 224 engages the first co-pilot deadzone engaging element 232. After the first co-pilot deadzone engaging element 232 engages an end of the arcuate slot 228, the first co-pilot shaft 200 will then begin to rotate about its longitudinal axis L3. Subsequently, rotation of the first co-pilot shaft 200 will cause the first co-pilot connecting rod 204 to correspondingly rotate the second co-pilot shaft 202. Thus, the electrical signals generated by the position transducers 108A, 108B associated with the first pilot shaft 100 will differ from the electrical signals generated by the co-pilot position transducers 208A, 208B, 210A, 210B, and the position transducers 108A, 108B associated with the first pilot shaft 100 and the co-pilot position transducers 208A, 208B, 210A, 210B will all communicate electrical signals to the flight control unit that differ from the electrical signals communicated by the position transducers 110A, 110B associated with the second pilot shaft 102. In response to the detected failure, the flight control unit may be configured to generate and communicate an electrical signal to the respective aircraft control surfaces that corresponds to a corrected control command.

Likewise, if failure of the second co-pilot shaft 202 were to occur, the position transducers 210A, 210B mechanically coupled thereto may communicate an electrical signal to the flight control unit that differs from the electrical signals provided to the flight control unit by the other position transducers 108A, 108B, 110A, 110B, 208A, 208B mechanically coupled to the respective first pilot shaft 100, second pilot shaft 102, and first co-pilot shaft 200. For example, as the first pilot shaft 100 rotates about the longitudinal axis L1, the second coupling rod 302 causes the co-pilot force transducer linkage 224 to rotate about the first co-pilot shaft 200 until an end of the arcuate slot 228 defined by the co-pilot force transducer linkage 224 engages the first co-pilot deadzone engaging element 232. After the first co-pilot deadzone engaging element 232 engages an end of the arcuate slot 228, the first co-pilot shaft 200 will then begin to rotate about its longitudinal axis L3. Additionally, as the first pilot shaft 100 rotates about the longitudinal axis L1, the second pilot shaft 102 will rotate in a corresponding manner as the pilot shafts 100, 102 are mechanically coupled to one another by the first pilot connecting rod 104. Thus, the electrical signals generated by the pilot position transducers 108A, 108B, 110A, 110B will differ from the electrical signals generated by the position transducers 208A, 208B associated with the first co-pilot shaft 200. In response to the detected failure, the flight control unit may be configured to communicate an electrical signal to the respective aircraft control surfaces that corresponds to a corrected control command.

According to one possible scenario, the first coupling rod 300 may become decoupled from other components in the aircraft control system 5. In such a case, the position transducers 108A, 108B, 110A, 110B associated with the first and second pilot shafts 100, 102 will communicate electrical signals to the flight control unit that indicate the shafts are rotating in a corresponding manner through the first pilot connecting rod 104. Likewise, the co-pilot position transducers 208A, 208B, 210A, 210B will communicate respective electrical signals to the flight control unit that indicate the co-pilot shafts 200, 202 are rotating in a corresponding manner with respect to one another through the first co-pilot connecting rod 204. However, the failure of the first coupling rod 300 will cause the pilot position transducers 108A, 108B, 110A, 110B to communicate electrical signals to the flight control unit that differ from the electrical signals communicated by the co-pilot position transducers 208A, 208B, 210A, 210B. In particular, rotation of the first pilot shaft 100 about the longitudinal axis L1 will cause the second coupling rod 302 to rotate the co-pilot force transducer linkage 224 about the first co-pilot shaft 200 until an end of the arcuate slot 228 defined by the co-pilot force transducer linkage 224 engages the first co-pilot deadzone engaging element 232. After the first co-pilot deadzone engaging element 232 engages an end of the arcuate slot 228, the first co-pilot shaft 200 will then begin to rotate about its longitudinal axis L3. The second co-pilot shaft 202 will rotate in a corresponding manner with respect to the first co-pilot shaft 200 as the first and second co-pilot shafts 200, 202 are directly and mechanically coupled to one another through the first co-pilot connecting rod 204. Thus, the electrical signals generated by the pilot position transducers 108A, 108B, 110A, 110B will differ from the electrical signals generated by the co-pilot position transducers 208A, 208B, 210A, 210B. In response to the detected failure, the flight control unit may be configured to communicate an electrical signal to the respective aircraft control surfaces that corresponds to a corrected control command.

In another possible scenario, the second coupling rod 302 may become decoupled from other components in the aircraft control system 5. For example, when the second coupling rod 302 fails and/or becomes decoupled while the aircraft is flying, the flight control unit will receive electrical signals from each of the position transducers 108A, 108B, 110A, 110B, 208A, 208B, 210A, 210B that corresponds with the rotation of the respective shafts 100, 102, 200, 202 that are substantially equal to one another. However, when the aircraft has landed and/or prior to takeoff, the pilot and/or copilot may perform a post-flight and/or pre-flight check, which may include providing opposite inputs to the pilot wheel flight deck controller 106 and the co-pilot wheel flight deck controller 206. The pilot and co-pilot flight data recorder force transducers 122, 222 may be configured to provide an electrical signal to the flight control unit corresponding to the opposing input forces provided to the respective pilot wheel flight deck controller 106 and the co-pilot wheel flight deck controller 206. Under normal operating conditions, the second coupling rod 302 will resist the opposing input forces, and the flight data recorder force transducers 122, 222 will communicate an electrical signal to the flight control unit indicating as such. However, when the second coupling rod 302 has failed, the flight data recorder force transducers 122, 222 will communicate an electrical signal to the flight control unit that corresponds with the second coupling rod 302 providing subthreshold resistance to the opposing input forces to the respective wheel flight deck controllers 106, 206, and in response, the flight control unit may communicate an electrical signal indicating such failure to a control panel.

Referring to FIG. 2, the pilot and co-pilot flight control systems P, A may also include a pilot pedal flight deck controller 144 and an co-pilot pedal flight deck controller 244. Additionally, the aircraft control system 5 may include a pilot jackshaft assembly 140 and an co-pilot jackshaft assembly 240. Each jackshaft assembly 140, 240 may include a jackshaft 142, 242 respectively. Each of the jackshafts 142, 242 may be configured to rotate about a longitudinal axis Y1, Y2 defined by the pilot and co-pilot jackshafts 142, 242 respectively. In particular, the pilot jackshaft 142 may rotate about its longitudinal axis VI in response to a force exerted on the pilot pedal flight deck controller 144. Likewise, the co-pilot jackshaft 242 may rotate about its longitudinal axis Y2 in response to a force exerted on the co-pilot pedal flight deck controller 244.

A first pilot connecting rod 104A may have a first end mechanically coupled to the first pilot shaft 100 and an opposing second end mechanically coupled to the pilot jackshaft 142. According to some aspects, a second pilot connecting rod 104B may include a first end mechanically coupled to the second pilot shaft 102 and an opposing second end mechanically coupled to the pilot jackshaft 142. Likewise, the co-pilot flight control system A may include a first co-pilot connecting rod 204A and a second co-pilot connecting rod 204B. The first co-pilot connecting rod 204A may include a first end mechanically coupled to the first co-pilot shaft 200 and an opposing second end mechanically coupled to the co-pilot jackshaft 242. The second co-pilot connecting rod 204B may include a first end mechanically coupled to the second co-pilot shaft 202 and an opposing second end mechanically coupled to the co-pilot jackshaft 242. As such, when the pilot jackshaft 142 rotates about its longitudinal axis Y1, the first and second pilot connecting rods 104A, 104B are displaced accordingly and cause the first and second pilot shafts 100, 102 to rotate about their respective longitudinal axis L1, L2. Likewise, rotation of the co-pilot jackshaft 242 about its longitudinal axis Y2 displaces the first and second co-pilot connecting rods 204A, 204B such that the first co-pilot shaft 200 rotates about its longitudinal axis L3 and the second co-pilot shaft 202 rotates correspondingly about its longitudinal axis L4.

Additionally, the first coupling rod 300 may have a first end mechanically coupled to the pilot jackshaft 142 and an opposing second end of the first coupling rod 300 may be mechanically coupled to the co-pilot jackshaft 242. According to some aspects, the aircraft control system may include a second coupling rod 302 that includes a first end mechanically coupled to the pilot jackshaft 142. An opposing second end of the second coupling rod may be mechanically coupled to the co-pilot jackshaft 242. As such, rotation of the pilot jackshaft 142 about its longitudinal axis Y1 may cause either of the first and second coupling rods 300, 302 to displace and cause the co-pilot jackshaft 242 to correspondingly rotate about its longitudinal axis Y2. Likewise, rotation of the co-pilot jackshaft 242 about its longitudinal axis Y2 may cause either of the first and second coupling rods 300, 302 to displace and cause the pilot jackshaft 142 to correspondingly rotate about its longitudinal axis Y1.

The pilot and co-pilot flight control systems P, A include a plurality of position transducers 108, 110, 208, 210 mechanically coupled to the first pilot shaft 100, second pilot shaft 102, first co-pilot shaft 200, and second co-pilot shaft 202 respectively. The position transducers 108, 110, 208, 210 are configured to generate an electrical signal corresponding to the rotation of the respective first pilot shaft 100, second pilot shaft 102, first co-pilot shaft 200, and second co-pilot shaft 202. Additionally, the position transducers 108, 110, 208, 210 are configured to communicate the electrical signal to the flight control unit.

In one possible scenario, the pilot flight data recorder force transducer 122 may become decoupled from the pilot jackshaft 142 and/or the pilot pedal flight deck controller 144. When the pilot flight data recorder force transducer 122 becomes decoupled from either of the pilot jackshaft 142 and/or the pilot pedal flight deck controller 144, the pilot may experience a loss in fidelity when providing an input force to the pilot pedal flight deck controller 144. The flight control unit will receive electrical signals from each of the position transducers 108, 110, 208, 210 corresponding with the rotation of the respective shafts 100, 102, 200, 202 that are substantially equal to one another. However, the flight control unit will also receive an electrical signal from the pilot flight data recorder force transducer 122 indicating that the pilot flight data recorder force transducer 122 has become decoupled, and the flight control unit may communicate an electrical signal to the respective aircraft control surfaces that corresponds to a corrected control command.

Likewise, if the co-pilot flight data recorder force transducer 222 were to become decoupled from either of the co-pilot jackshaft 242 and/or the co-pilot pedal flight deck controller 244, the copilot will experience a loss in fidelity when providing an input force to the co-pilot pedal flight deck controller 244. The flight control unit will receive electrical signals from each of the position transducers 108, 110, 208, 210 corresponding with the rotation of the respective shafts 100, 102, 200, 202 that are substantially equal to one another. However, the flight control unit will also receive an electrical signal from the co-pilot flight data recorder force transducer 222 indicating that the co-pilot flight data recorder force transducer 222 has become decoupled, and the flight control unit may be configured to communicate an electrical signal to the respective aircraft control surfaces that corresponds to a corrected control command.

In yet another possible scenario, the first pilot shaft 100 may fail by, for example, shearing into separate pieces. Additionally or alternatively, the first pilot connecting rod 104A may fail and/or become decoupled from the first pilot shaft 100. In either possible failure mode, the first pilot shaft 100 will become unresponsive to any rotation of the pilot jackshaft 142, and the first pilot shaft 100 will cease to rotate about the longitudinal axis L1. Consequently, the position transducer 108 mechanically coupled to the first pilot shaft 100 will communicate an electrical signal to the flight control unit that differs from the electrical signals provided to the flight control unit by the other position transducers 110, 208, 210 mechanically coupled to the respective second pilot shaft 102, first co-pilot shaft 200, and second co-pilot shaft 202. In response, the flight control unit may be configured to communicate the electrical signals from the operational position transducer 110, 208, 210 to the respective aircraft flight control surfaces to compensate for the detected failure. In another aspect, the flight control unit thereby determines that the electrical signal communicated by the position transducer 108 mechanically coupled to the first pilot shaft 100 does not correspond with the electrical signals communicated by the other position transducers 110, 208, 210, and the flight control unit may be configured to communicate an electrical signal that corresponds to a corrected control command to operate the respective aircraft control surfaces.

Likewise, if the first co-pilot shaft 200 and/or the first co-pilot connecting rod 204A were to fail and/or become decoupled, the position transducer 208 mechanically coupled to the first co-pilot shaft 200 will communicate an electrical signal to the flight control unit that differs from the electrical signals communicated to the flight control unit by the other position transducers 108, 110, 210 mechanically coupled to the respective first pilot shaft 100, second pilot shaft 102, and second co-pilot shaft 202. When either the first co-pilot shaft 200 and/or the first co-pilot connecting rod 204A fails, the first co-pilot shaft 200 will become unresponsive to any rotation of the co-pilot jackshaft 242, and the first co-pilot shaft 200 will cease to rotate about the longitudinal axis L3. In particular, the position transducers 108, 110, 210 mechanically coupled to the respective first pilot shaft 100, second pilot shaft 102, and second co-pilot shaft 202 will communicate an electrical signal to the flight control unit that indicates the respective shafts are rotating in a corresponding manner, while the position transducer 208 coupled to the first co-pilot shaft 200 will provide an electrical signal that indicates that the first co-pilot shaft 200 and/or the first co-pilot connecting rod 204A has failed. In response, the flight control unit may be configured to communicate the electrical signals from the operational position transducer 108, 110, 210 to the respective aircraft flight control surfaces to compensate for the detected failure. In another aspect, the flight control unit may determine that the electrical signal communicated by the position transducer 208 mechanically coupled to the first co-pilot shaft 200 does not correspond with the electrical signals communicated by the other position transducers 108, 110, 210, and the flight control unit may be configured to generate an electrical signal that corresponds to a corrected control command to operate the respective aircraft control surfaces.

According to another example scenario, the second pilot shaft 102 may fail by, for example, shearing into separate pieces. Additionally or alternatively, the second pilot connecting rod 104B may fail and/or become decoupled from the second pilot shaft 200 and/or the pilot jackshaft 142. In either possible failure mode, the second pilot shaft 102 will become unresponsive to any rotation of the pilot jackshaft 142, and the second pilot shaft 102 will cease to rotate about the longitudinal axis L2. Consequently, the position transducer 110 mechanically coupled to the second pilot shaft 102 will provide an electrical signal to the flight control unit that differs from the electrical signals provided to the flight control unit by the other position transducers 108, 208, 210 mechanically coupled to the respective first pilot shaft 100, first co-pilot shaft 200, and second co-pilot shaft 202. In response, the flight control unit may be configured to communicate the electrical signals from the operational position transducers 108, 208, 210 to the respective aircraft flight control surfaces to compensate for the detected failure. In another aspect, the flight control unit may determine that the electrical signal communicated by the position transducer 110 mechanically coupled to the second pilot shaft 102 does not correspond with the electrical signals communicated by the other position transducers 108, 208, 210, and the flight control unit may be configured to generate an electrical signal that corresponds to a corrected control command to operate the respective aircraft control surfaces.

Likewise, should the second co-pilot shaft 200 and/or the second co-pilot connecting rod 204B fail and/or become decoupled, the position transducer 210 mechanically coupled to the second co-pilot shaft 202 will communicate an electrical signal to the flight control unit that differs from the electrical signals provided to the flight control unit by the other position transducers 108, 110, 208 mechanically coupled to the respective first pilot shaft 100, second pilot shaft 102, and first co-pilot shaft 200. Should either the second co-pilot shaft 200 and/or the second co-pilot connecting rod 204B fails, the second co-pilot shaft 202 will become unresponsive to any rotation of the co-pilot jackshaft 242, and the second co-pilot shaft 202 will cease to rotate about the longitudinal axis L4. In particular, the position transducers 108, 110, 208 mechanically coupled to the respective first pilot shaft 100, second pilot shaft 102, and first co-pilot shaft 202 will communicate an electrical signal to the flight control unit that indicates the respective shafts are rotating in a corresponding manner, while the position transducer 210 coupled to the second co-pilot shaft 202 will provide an electrical signal that indicates that the second co-pilot shaft 202 and/or the second co-pilot connecting rod 204B has failed. In response, the flight control unit may be configured to communicate the electrical signals from the operational position transducer 108, 110, 208 to the respective aircraft flight control surfaces to compensate for the detected failure. In another aspect, the flight control unit may determine that the electrical signal communicated by the position transducer 210 mechanically coupled to the second co-pilot shaft 202 does not correspond with the electrical signals communicated by the other position transducers 108, 110, 208, and the flight control unit may be configured to communicate an electrical signal that corresponds to a corrected control command to operate the respective aircraft control surfaces.

In the event that the first coupling rod 300 becomes decoupled and/or fails, rotation of the pilot jackshaft 142 about its longitudinal axis Y1 will cause the second coupling rod 302 to correspondingly rotate the co-pilot jackshaft 242 about its longitudinal axis Y2 Likewise, rotation of the co-pilot jackshaft 242 about its longitudinal axis Y2 will cause the second coupling rod 302 to correspondingly rotate the pilot jackshaft 142 about its longitudinal axis Y1. As such, failure of the first coupling rod 300 will still be mitigated by the second coupling rod 302 while the aircraft is in flight, and the pilot and co-pilot position transducers 108, 110, 208, 210 mechanically coupled to the respective first and second shafts 100, 102, 200, 202 will communicate electrical signals to the flight control unit that indicate the shafts 100, 102, 200, 202 are rotating in a corresponding manner with respect to one another. Likewise, should the second coupling rod 302 were to fail and/or become decoupled from one or both of the pilot and co-pilot jackshafts 142, 242, the first coupling rod 300 will mitigate the failure and the position transducers 108, 110, 208, 210 mechanically coupled to the respective first and second shafts 100, 102, 200, 202 will communicate electrical signals to the flight control unit that indicate the shafts 100, 102, 200, 202 are rotating in a corresponding manner with respect to one another. However, when the aircraft has landed and/or prior to takeoff, the pilot and/or copilot may perform a post-flight and/or pre-flight check, which may include providing opposite inputs to the pilot pedal flight deck controller 144 and the co-pilot pedal flight deck controller 244.

If either of the first and/or second coupling rods 300, 302 has become decoupled and/or failed, during the opposite input force test, the pilot position transducers 108, 110 will communicate an electrical signal to the flight control unit that differs from the electrical signals communicated by the co-pilot position transducers 208, 210. Further, the flight control unit may be configured to communicate an electrical signal that corresponds to a corrected control command to operate the respective aircraft control surfaces.

Referring to FIG. 3, the pilot flight control system P and the co-pilot flight control system A may include a pilot column flight deck controller 150 and an co-pilot column flight deck controller 250 that are each coupled to the respective first pilot and co-pilot shafts 100, 200. In particular, a first end of a pilot flight data recorder force transducer 122 may be mechanically coupled to the pilot column flight deck controller 150, and the opposing second end of the pilot flight data recorder force transducer 122 may be mechanically coupled to the first pilot shaft 100. In some aspects, the opposing second end of the pilot flight data recorder force transducer 122 may be coupled to a pilot feel and centering unit 138 that is mechanically coupled to the first pilot shaft 100. Likewise, an co-pilot flight data recorder force transducer 222 may include a first end mechanically coupled to the co-pilot column flight deck controller 250 and an opposing second end that is mechanically coupled to an co-pilot feel and centering unit 238 that is mechanically coupled to the first co-pilot shaft 200.

The pilot flight control system P includes a pair of first pilot position transducers 108A, 108B mechanically coupled to the first pilot shaft 100. Likewise, the co-pilot flight control system A includes a pair of position transducers 208A, 208B mechanically coupled to the first co-pilot shaft 200. The second pilot shaft 102 is mechanically coupled to a second pilot position transducer 110, and the second co-pilot shaft 202 is mechanically coupled to a second co-pilot position transducer 210. The position transducers 108A, 108B, 110, 208A, 208B, 210 are configured to generate an electrical signal corresponding to the rotation of the respective first pilot shaft 100, second pilot shaft 102, first co-pilot shaft 200, and second co-pilot shaft 202, and are further configured to communicate the respective electrical signals to the flight control unit.

In one possible scenario, the pilot flight data recorder force transducer 122 may become decoupled from the first pilot shaft 100 and/or the pilot column flight deck controller 150. When the pilot flight data recorder force transducer 122 becomes decoupled from either of the first pilot shaft 100 and/or the pilot column flight deck controller 150, the pilot may experience a loss in fidelity when providing an input force to the pilot column flight deck controller 150. In particular, the decoupling and/or failure of the pilot flight data recorder force transducer 122 may cause the pilot column flight deck controller 150 to fall forward and become completely unresponsive. The flight control unit will receive electrical signals from each of the position transducers 108A, 108B, 110, 208A, 208B, 210 corresponding with the rotation of the respective shafts 100, 102, 200, 202 that are substantially equal to one another. However, the flight control unit will also receive an electrical signal from the pilot flight data recorder force transducer 122 indicating that the pilot flight data recorder force transducer 122 has become decoupled, and the flight control unit may be configured to communicate an electrical signal that corresponds to a corrected control command to operate the respective aircraft control surfaces.

Likewise, should the co-pilot flight data recorder force transducer 222 become decoupled from either of the first co-pilot shaft 200 and/or the co-pilot column flight deck controller 250, the copilot will experience a loss in fidelity when providing an input force to the co-pilot column flight deck controller 250. The flight control unit will receive electrical signals from each of the position transducers 108A, 108B, 110, 208A, 208B, 210 corresponding with the rotation of the respective shafts 100, 102, 200, 202 that are substantially equal to one another. However, the flight control unit will also receive an electrical signal from the co-pilot flight data recorder force transducer 222 indicating that the co-pilot flight data recorder force transducer 222 has become decoupled, and the flight control unit may be configured to communicate an electrical signal that corresponds to a corrected control command to operate the respective aircraft control surfaces.

In yet another example possible scenario, the first pilot shaft 100 may fail by, for example, shearing into separate pieces. Thus, the first pilot shaft 100 will become unresponsive to any input force and will cease to rotate about the longitudinal axis L1. In another possible failure mode, the pilot connecting rod 104 mechanically coupling the first pilot shaft 100 to the second pilot shaft 102 may fail and/or become decoupled at either end. In response to the failure of the first pilot shaft 100 and/or the pilot connecting rod 104, the position transducers 108A, 108B mechanically coupled to the first pilot shaft 100 will provide an electrical signal to the flight control unit that differs from the electrical signals provided to the flight control unit by the other position transducers 110, 208A, 208B, 210 mechanically coupled to the respective second pilot shaft 102, first co-pilot shaft 200, and second co-pilot shaft 202. The co-pilot may still control the aircraft with the co-pilot column flight deck controller 206. Accordingly, the position transducers 110, 208A, 208B, 210 mechanically coupled to the respective second pilot shaft 102, first co-pilot shaft 200, and second co-pilot shaft 202 will provide an electrical signal to the flight control unit that indicates the respective shafts are rotating in a corresponding manner, while the position transducers 108A, 108B coupled to the first pilot shaft 100 will provide an electrical signal that indicates that the first pilot shaft 100 has failed (i.e., the first pilot shaft 100 is not rotating). In response, the flight control unit may be configured to communicate the electrical signals from the operational position transducer 110, 208A, 208B, 210 to the respective aircraft flight control surfaces to compensate for the detected failure. In another aspect, the flight control unit may determine that the electrical signals generated by the position transducers 108A, 108B associated with the first pilot shaft 100 do not correspond with the electrical signals generated by the other position transducers 110, 208A, 208B, 210, and the flight control unit may be configured to communicate an electrical signal that corresponds to a corrected control command to operate the respective aircraft control surfaces.

Likewise, if the first co-pilot shaft 200 were to fail, the position transducers 208A, 208B associated with the first co-pilot shaft 200 will communicate an electrical signal to the flight control unit that differs from the electrical signals provided to the flight control unit by the other position transducers 108A, 108B, 110, 210 mechanically coupled to the respective first pilot shaft 100, second pilot shaft 102, and second co-pilot shaft 202. Additionally, the first co-pilot shaft 200 will become unresponsive to any input force provided to the co-pilot column flight deck controller 250 and will cease to rotate about the longitudinal axis L2. Additionally or alternatively, the co-pilot connecting rod 204 mechanically coupling the first co-pilot shaft 200 to the second co-pilot shaft 202 may fail and/or become decoupled at either end. In response to the failure of the first co-pilot shaft 200 and/or the co-pilot connecting rod 204, the position transducers 108A, 108B, 110, 210 mechanically coupled to the respective first pilot shaft 100, second pilot shaft 102, and second co-pilot shaft 202 will communicate an electrical signal to the flight control unit that indicates the respective shafts are rotating in a corresponding manner, while the position transducers 208A, 208B coupled to the first co-pilot shaft 200 will provide an electrical signal that indicates that the first co-pilot shaft 200 has failed (i.e., the first co-pilot shaft 200 is not rotating). In response, the flight control unit may be configured to communicate the electrical signals from the operational position transducer 108A, 108B, 110, 210 to the respective aircraft flight control surfaces to compensate for the detected failure. In another aspect, the flight control unit may determine that the electrical signals communicated by the position transducers 208A, 208B associated with the first co-pilot shaft 200 do not correspond with the electrical signals generated by the other position transducers 108A, 108B, 110, 210, and the flight control unit may be configured to communicate an electrical signal that corresponds to a corrected control command to operate the respective aircraft control surfaces.

In another possible scenario, the second pilot shaft 102 may fail, for example, by shearing into separate pieces. In such an event, the position transducer 110 mechanically coupled to the second pilot shaft 102 may communicate an electrical signal to the flight control unit that differs from the electrical signals provided to the flight control unit by the other position transducers 108A, 108B, 208A, 208B, 210 mechanically coupled to the respective first pilot shaft 100, first co-pilot shaft 200, and second co-pilot shaft 202. In response to the detected failure, the flight control unit may be configured to communicate an electrical signal to the respective aircraft control surfaces that corresponds to a corrected control command.

Likewise, if the second co-pilot shaft 202 were to fail, the position transducer 210 mechanically coupled to the second co-pilot shaft 202 may communicate an electrical signal to the flight control unit that differs from the electrical signals communicated to the flight control unit by the other position transducers 108A, 108B, 110, 208A, 208B mechanically coupled to the respective first pilot shaft 100, second pilot shaft 102, and first co-pilot shaft 200. In response to the detected failure, the flight control unit may be configured to communicate an electrical signal to the respective aircraft control surfaces that corresponds to a corrected control command.

According to another example scenario, the first coupling rod 300 mechanically coupling the second pilot shaft 102 to the second co-pilot shaft 202 may become decoupled. In such a case, the pilot position transducers 108A, 108B, 110 associated with the first and second pilot shafts 100, 102 will communicate electrical signals to the flight control unit that indicate the shafts are rotating in a corresponding manner through the first pilot connecting rod 104. Likewise, the co-pilot position transducers 208A, 208B, 210 will communicate respective electrical signals to the flight control unit that indicate the co-pilot shafts 200, 202 are rotating in a corresponding manner with respect to one another through the first co-pilot connecting rod 204. However, the failure of the first coupling rod 300 will cause the pilot position transducers 108A, 108B, 110 to communicate electrical signals to the flight control unit that differ from the electrical signals communicated by the co-pilot position transducers 208A, 208B, 210, and in response to the detected failure, the flight control unit may be configured to communicate an electrical signal to the respective aircraft control surfaces that corresponds to a corrected control command.

According to another aspect of the present disclosure, a method of manufacturing a fly-by-wire aircraft control system is also provided. As shown in FIG. 5, the method 500 may include coupling a first shaft to a second shaft of a pilot flight control system and coupling a first shaft to a second shaft of an co-pilot flight control system (Block 502). The respective first shafts of the pilot and co-pilot flight control systems being displaced apart from the respective second shafts of the pilot and co-pilot flight control systems.

Additionally, the method may include coupling a position transducer to each shaft of the pilot and co-pilot flight control system (Block 504). Each position transducer is configured to generate an electrical signal corresponding to the rotation of the respective shaft to a flight control unit.

According to some aspects, the method may include connecting the flight control unit in electrical communication with each of the position transducers (Block 506). The flight control unit is configured to receive the electrical signal from each of the position transducers. Additionally, the flight control unit is configured to detect a failure of the pilot or co-pilot flight control system, in part, by detecting differences in the electrical signals generated by the position transducers. The flight control unit may be further configured to communicate the electrical signal from the operational position transducer(s) to a flight control surface to compensate for the detected failure.

In some aspects, the method may further include coupling a pilot flight deck controller and an co-pilot flight deck controller to the corresponding first shafts of the pilot flight control system and the co-pilot flight control system respectively. The pilot and co-pilot flight deck controllers may be configured to rotate the respective first pilot and first co-pilot shafts about the longitudinal axis thereof. In addition, the method may include coupling at least one of the pilot shafts to one of the co-pilot shafts with at least one linkage such that rotation of the one of the pilot shafts about the longitudinal axis thereof causes rotation of the coupled one of the co-pilot shafts about the longitudinal axis thereof.

The method may further include coupling a first end of a first pilot connecting rod to the first pilot shaft and an opposing second end of the first pilot connecting rod to the second pilot shaft. Additionally, the method may include coupling a first end of a first co-pilot connecting rod to the first co-pilot shaft and an opposing second end of the first co-pilot connecting rod to the second co-pilot shaft such that rotation of one of the shafts about the longitudinal axis thereof causes rotation in the others of the first and second pilot and first and second co-pilot shafts.

The method may also include coupling a first end of a first coupling rod to the second pilot shaft and an opposing second end to the second co-pilot shaft such that rotation of one of the second pilot shaft and co-pilot shafts about the respective longitudinal axis thereof causes the first coupling rod to correspondingly rotate the other of the second pilot and co-pilot shaft about the longitudinal axis thereof. Likewise, rotation of the first pilot and co-pilot shafts about the respective longitudinal axis thereof causes corresponding rotation of the respective second pilot and co-pilot shafts about the respective longitudinal axis thereof.

The method may further include coupling a pilot and an co-pilot flight deck controller to a respective pilot and co-pilot jackshaft assembly. Each jackshaft assembly may include a jackshaft configured to rotate about a respective longitudinal axis defined thereby. In particular, the pilot and co-pilot jackshafts may be configured to rotate about their respective longitudinal axis in response to a force exerted onto the corresponding pilot and co-pilot flight deck controllers. The pilot and co-pilot flight deck controllers are mechanically coupled to the corresponding jackshaft assembly and may include a pair of pedals.

The method may further include coupling a first end of a second pilot connecting rod to the second pilot shaft and coupling a first end of a second co-pilot connecting rod to the second co-pilot shaft. In some aspects, the method may include coupling an opposing second end of the second pilot connecting rod to the pilot jackshaft and coupling an opposing second end of the second co-pilot connecting rod to the co-pilot jackshaft. Accordingly, rotation of the pilot jackshaft about the longitudinal axis defined thereby causes an associated rotation of the first pilot shaft about the longitudinal axis thereof through the first pilot connecting rod. Additionally, the rotation of the pilot jackshaft about the longitudinal axis defined thereby causes the second pilot shaft to rotate about its longitudinal axis that corresponds with the rotation of the first pilot shaft via the second pilot connecting rod. Likewise, rotation of the co-pilot jackshaft about the longitudinal axis thereof causes an associated rotation of the first co-pilot shaft about the longitudinal axis thereof through the first co-pilot connecting rod mechanically coupled to the first co-pilot shaft. Additionally, the rotation of the co-pilot jackshaft about the longitudinal axis thereof causes the second co-pilot connecting rod to displace and rotate the second co-pilot shaft that corresponds with the rotation of the first co-pilot shaft.

The method may further include coupling a first end of a second coupling rod to the pilot jackshaft and an opposing second end of the second coupling rod to the co-pilot jackshaft. As one of the pilot and co-pilot jackshafts rotates about its respective longitudinal axis, the second coupling rod causes corresponding rotation of the other of the pilot and co-pilot jackshafts about the longitudinal axis thereof.

In some aspects, the method may further include coupling a first end of a pilot flight data recorder force transducer directly to a pilot flight data recorder linkage having a first end securely attached to a pilot wheel pulley. The method may further include coupling an opposing second end of the pilot flight data recorder force transducer directly to a pilot force transducer linkage, the pilot force transducer linkage being axially displaced along the first pilot shaft from the pilot wheel pulley and being rotatable about the first pilot shaft.

In some aspects, the method may include coupling a first end of a bank angle protection force transducer directly to the pilot force transducer linkage. The method may further include coupling an opposing second end of the bank angle protection force transducer directly to a first pilot dead zone linkage. In some aspects, the method may include attaching a second pilot deadzone linkage to the first pilot shaft. Additionally, the method may include coupling a first end of an co-pilot flight data recorder force transducer directly to an co-pilot flight data recorder linkage having a first end securely attached to an co-pilot wheel pulley.

The method may further include coupling an opposing second end of the co-pilot flight data recorder force transducer directly to an co-pilot force transducer linkage. In some aspects, the method includes attaching a first co-pilot dead zone linkage to the first co-pilot shaft. The method may further include attaching a second co-pilot deadzone linkage to the first co-pilot shaft, coupling a first end of a second coupling rod directly to the pilot force transducer linkage, and coupling an opposing second end of the second coupling rod directly to the co-pilot force transducer linkage.

According to some aspects, the method may further include coupling a first end of a pilot flight data recorder force transducer to the pilot flight deck controller and coupling an opposing second end of the pilot flight data recorder force transducer to the first pilot shaft. The method may include coupling a first end of an co-pilot flight data recorder force transducer to the co-pilot flight deck controller and coupling an opposing second end of the co-pilot flight data recorder force transducer to the first co-pilot shaft.

Figure 6:
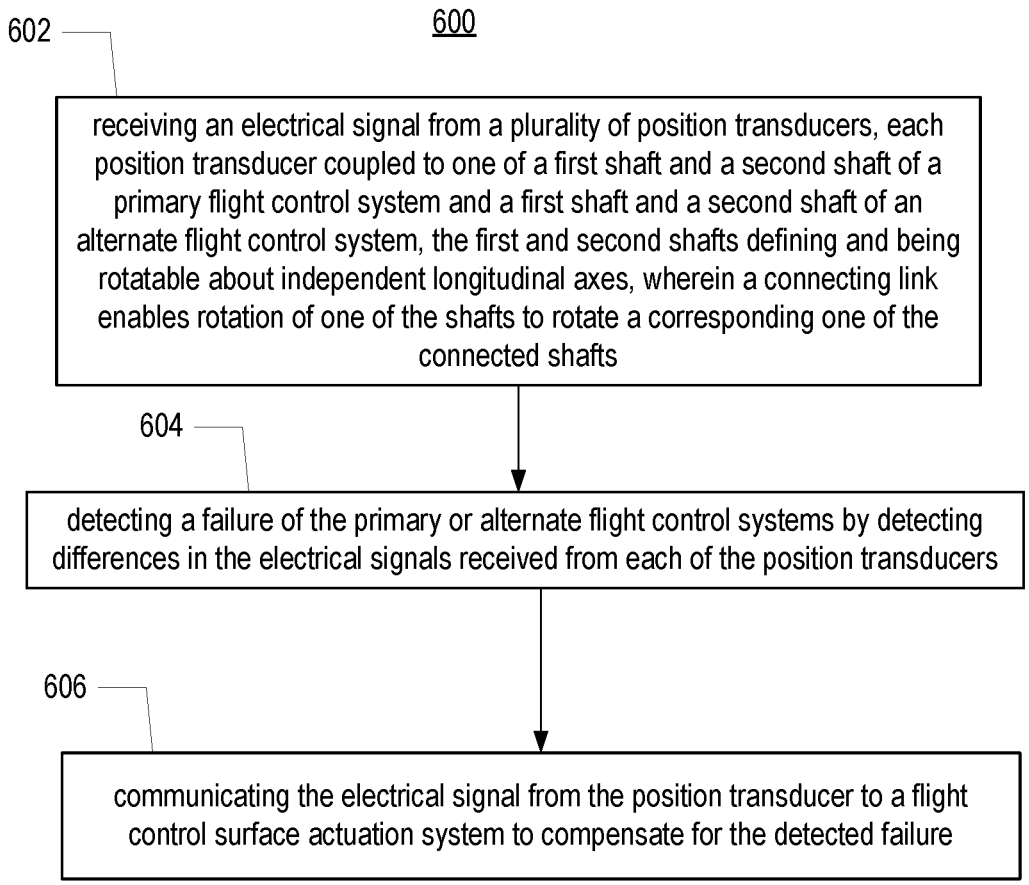
FIG. 6 illustrates a block diagram of a method of controlling a fly-by-wire aircraft control system according to one aspect of the present disclosure.

In some aspects, a method of controlling a fly-by-wire aircraft control system is also provided. As shown in FIG. 6, the method 600 may include receiving an electrical signal from a plurality of position transducers (Block 602). Each position transducer may be coupled to one of a first shaft and a second shaft of a pilot flight control system, and a first shaft and a second shaft of an co-pilot flight control system. The first and second shafts define independent longitudinal axes, and each shaft is rotatable about the respective longitudinal axes. The flight control system may further include a connecting link that enables rotation of one of the shafts to rotate a corresponding one of the connected shafts.

In some aspects, the method may include receiving an electrical signal from a position transducer coupled to the first shafts of the respective pilot and co-pilot flight control systems. The first shafts may be mechanically coupled to respective pilot and co-pilot flight deck controllers. According to some aspects, the method may include receiving an electrical signal from a position transducer coupled to one of the first and second shafts of the respective pilot and co-pilot control systems. Additionally, at least one linkage may mechanically couple one of the pilot shafts to one of the co-pilot shafts such that rotation of one of the pilot shafts about the longitudinal axis thereof causes corresponding rotation of the coupled one of the co-pilot shafts.

In some aspects, the method may further include receiving an electrical signal from the first pilot position transducer associated with the rotation of the first pilot shaft that differs from an electrical signal received from the second pilot position transducer associated with the rotation of the second pilot shaft in response to a failure of a first pilot connecting rod having one end mechanically coupled to the first pilot shaft and an opposing second end mechanically coupled to the second pilot shaft.

According to some aspects, the method may further include receiving an electrical signal from the first co-pilot position transducer associated with the rotation of the first co-pilot shaft that differs from an electrical signal received from the second co-pilot position transducer associated with the rotation of the second co-pilot shaft in response to a failure of the first co-pilot connecting rod having one end mechanically coupled to the first co-pilot shaft and an opposing second end mechanically coupled to the second co-pilot shaft.

In some aspects, the flight control system may include a pilot and co-pilot jackshaft assembly. Each jackshaft assembly may include a jackshaft that defines a longitudinal axis. The pilot and co-pilot jackshafts may be configured to rotate about the respective longitudinal axis in response to a force exerted onto the flight deck controller. In some aspects, the flight deck controller may each include a pair of pedals that are mechanically coupled to the corresponding jackshaft assembly. Additionally, the flight control system may include a first coupling rod and a second coupling rod. Each coupling rod may mechanically couple one of the pilot shafts to one of the co-pilot shafts. For example, a coupling rod may include a first end mechanically coupled to the pilot jackshaft and an opposing second end mechanically coupled to the co-pilot jackshaft. Further, the method may include receiving an electrical signal from one of the pilot position transducers, in response to a failure of one of the first and second coupling rods, that is equal to an electrical signal received from one of the co-pilot position transducers.

According to some aspects, the method may further include receiving an electrical signal from a pilot flight data recorder force transducer and an electrical signal from an co-pilot flight data recorder force transducer. Each flight data recorder force transducer may have a first end mechanically coupled to the respective pilot and co-pilot flight deck controllers and an opposing second end mechanically coupled to the respective first pilot and co-pilot shafts. Additionally, in response to a failure of the corresponding one of the pilot and co-pilot flight data recorder force transducers, the corresponding one of the pilot and co-pilot flight deck controllers may be configured to lose fidelity in flight control.

According to some aspects, the method may further include detecting a failure of the pilot or co-pilot flight control systems by detecting differences in the electrical signals received from each of the position transducers (Block 604). In some aspects, a flight control unit may be configured to detect a failure of the pilot and/or co-pilot flight control systems. The pilot and co-pilot flight control systems may include a plurality of position transducers, and the electrical signals transmitted by the plurality of position transducers may be compared to one another to determine the operational state (e.g., healthy, degraded, faulty, etc.) of the position transducers.

In some aspects, the method may further include communicating the electrical signal from the position transducers to a flight control surface actuation system to compensate for the detected failure (Block 606). For example, the flight control unit may be configured to communicate the electrical signal from the operational position transducers to a flight control surface actuation system to compensate for the detected failure.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An aircraft control system comprising:
   pilot flight control system including a first pilot shaft mechanically coupled to and displaced apart from a second pilot shaft;
   co-pilot flight control system including a first co-pilot shaft mechanically coupled to and displaced apart from a second co-pilot shaft;
   wherein each pilot or co-pilot shaft of the pilot and co-pilot shafts is rotatable about a respective longitudinal axis that extends lengthwise along the pilot or co-pilot shaft, wherein a pilot and a co-pilot connecting link respectively enables rotation of one of the first pilot or co-pilot shafts to rotate a corresponding one of the second pilot or co-pilot shafts;
   a pilot and a co-pilot flight deck controller mechanically coupled to the respective first pilot and co-pilot shafts;
   position transducers, each of which is mechanically coupled to a respective shaft of the pilot and co-pilot shafts and configured to communicate an electrical signal corresponding to the rotation of the respective shaft;
   a pilot and an co-pilot wheel pulley mechanically coupled to the respective pilot and co-pilot flight deck controllers, the pilot and co-pilot wheel pulleys configured to, in response to a failure of one of the pilot or co-pilot connecting link, rotate the respective first pilot and co-pilot shafts; wherein the pilot and co-pilot flight deck controllers each include a pilot and a co-pilot wheel controller, the pilot and co-pilot wheel pulleys being mechanically coupled to respective wheel controllers such that rotation of the pilot wheel pulley about the respective longitudinal axis of the first pilot shaft correspondingly rotates the pilot wheel controller and rotation of the co-pilot wheel pulley about the respective longitudinal axis of the first co-pilot shaft correspondingly rotations the co-pilot wheel controller; and wherein the pilot and co-pilot wheel pulleys respectively define a first arcuate slot and a second arcuate slot proximate a respective outer peripheral portion, wherein the pilot and co-pilot wheel pulleys are rotatable about the respective longitudinal axes of the first pilot and co-pilot shafts;
   a flight control unit in communication with the position transducers and configured to: receive the electrical signal from each of the position transducers, detect a failure of the pilot or co-pilot flight control system by detecting differences in the electrical signals from the position transducers, and communicate the electrical signals from the position transducers to a flight control surface actuation system to compensate for the detected failure, the failure indicating a cease of rotation of at least one shaft of the pilot and co-pilot shafts about the respective longitudinal axis; and
   a first and second pilot deadzone linkage and a first and second co-pilot deadzone linkage, each deadzone linkage being non-rotatable attached to and extending radially from the respective first pilot and co-pilot shafts, each deadzone linkage having a first engaging element extending therefrom along a direction parallel to the respective longitudinal axis of the first pilot and co-pilot shafts, and a second engaging element extending through the respective first and second arcuate slots defined by the pilot and co-pilot wheel pulleys.

2. The system of claim 1, wherein rotation of the respective first pilot and co-pilot shafts about the respective longitudinal axis thereof causes the respective first and second engaging elements to orbit about the respective first pilot and co-pilot shafts.

3. The system of claim 1, further comprising: a pilot flight data recorder force transducer and a co-pilot flight data recorder force transducer.

4. The system of claim 3, wherein each flight data recorder force transducer comprises a first end mechanically coupled to the respective pilot and co-pilot flight deck controllers and an opposing second end mechanically coupled to the respective first pilot and co-pilot shafts.

5. The system of claim 4, wherein, in response to a failure of the corresponding one of the pilot and co-pilot flight data recorder force transducers, the corresponding one of the pilot and co-pilot flight deck controllers is configured to lose fidelity in flight control.

6. The system of claim 1, further comprising a pilot force transducer linkage and a co-pilot force transducer linkage.

7. The system of claim 6, wherein the pilot force transducer linkage is rotatable around the first pilot shaft and the co-pilot force transducer linkage is rotatable around the first co-pilot shaft.

8. The system of claim 7, wherein the pilot force transducer linkage defines a third arcuate slot and the co-pilot force transducer linkage defines a fourth arcuate slot.

9. The system of claim 8, wherein the third arcuate slot is aligned with the first arcuate slot along a direction parallel to the first pilot shaft and the fourth arcuate slot is aligned with the second arcuate slot in a direction parallel with the first co-pilot shaft.

10. The system of claim 7, wherein the pilot force transducer linkage is axially displaced from the pilot wheel pulley.

11. The system of claim 7, wherein the co-pilot force transducer linkage is axially displaced from the co-pilot wheel pulley.

12. The system of claim 6 further comprising a bank angle protection force transducer.

13. The system of claim 12, wherein the bank angle protection force transducer is configured as a linear differential variable transformer (LVDT).

14. The system of claim 12, wherein the bank angle protection force transducer is mechanically coupled to the pilot force transducer linkage.

15. The system of claim 13, the bank angle protection force transducer being mechanically coupled to the pilot force transducer linkage comprises a first end of the bank angle protection force transducer being directly coupled to the pilot force transducer linkage.

16. The system of claim 15, wherein a second end of the bank angle protection force transducer is mechanically coupled the first pilot deadzone linkage.

17. The system of claim 1, wherein the pilot wheel controller comprises a second pilot pulley and the co-pilot wheel controller comprises a second co-pilot pulley.

18. The system of claim 17, wherein the pilot and co-pilot wheel pulleys being mechanically coupled to respective wheel controllers comprises the pilot wheel pulley being mechanically coupled to the second pilot pulley via a first endless cable and the co-pilot wheel pulley being mechanically coupled to the second co-pilot pulley via a second endless cable.

19. The system of claim 1, wherein the first pilot shaft extends through the center of the pilot wheel pulley.

20. The system of claim 1, wherein the first co-pilot shaft extends through the center of the co-pilot wheel pulley.

* * * * *